United States Patent
Davis et al.

(10) Patent No.: US 12,344,272 B2
(45) Date of Patent: Jul. 1, 2025

(54) SYSTEM, METHOD, AND COMPUTER PROGRAM PRODUCT FOR DYNAMIC DETECTION THRESHOLD FOR LiDAR OF AN AUTONOMOUS VEHICLE

(71) Applicant: LG INNOTEK CO., LTD., Seoul (KR)

(72) Inventors: Ryan Thomas Davis, Austin, TX (US); Dane Bennington, Pittsburgh, PA (US); Mohamed Seghilani, Palo Alto, CA (US)

(73) Assignee: LG INNOTEK CO., LTD., Seoul (KR)

( * ) Notice: Subject to any disclaimer, the term of this patent is extended or adjusted under 35 U.S.C. 154(b) by 257 days.

(21) Appl. No.: 18/087,950

(22) Filed: Dec. 23, 2022

(65) Prior Publication Data
US 2024/0208532 A1 Jun. 27, 2024

(51) Int. Cl.
*B60W 60/00* (2020.01)
*G01S 17/894* (2020.01)

(52) U.S. Cl.
CPC ......... *B60W 60/001* (2020.02); *G01S 17/894* (2020.01); *B60W 2420/408* (2024.01)

(58) Field of Classification Search
None
See application file for complete search history.

(56) References Cited

U.S. PATENT DOCUMENTS

| | | | |
|---|---|---|---|
| 2018/0275249 A1* | 9/2018 | Campbell | G01S 7/4865 |
| 2020/0033481 A1* | 1/2020 | Lee | G01S 17/931 |
| 2020/0150232 A1 | 5/2020 | Liu et al. | |
| 2021/0096219 A1* | 4/2021 | Cox | G01S 7/484 |
| 2022/0120872 A1 | 4/2022 | Chen et al. | |
| 2022/0291387 A1* | 9/2022 | Pacala | G01S 7/4817 |
| 2023/0051395 A1* | 2/2023 | Wilton | G01S 7/484 |
| 2023/0375678 A1* | 11/2023 | Cadugan | G01S 7/4863 |

FOREIGN PATENT DOCUMENTS

DE 102019132673 A1 * 6/2020 ............. G01S 17/10

* cited by examiner

*Primary Examiner* — Daniel L Greene
(74) *Attorney, Agent, or Firm* — Birch, Stewart, Kolasch & Birch, LLP

(57) ABSTRACT

A system including a LiDAR system of an autonomous vehicle. The LiDAR system includes at least one light emitter and at least one light detector to generate analog output signals based on reflected pulses of light. A comparator receives the analog output signals from the light detector and generates digital output signals based on the analog output signals and a threshold. A controller receives a first digital output signal of the digital output signals from the comparator based on the threshold, adjusts the threshold, receives at least one further digital output signal of the digital output signals from the comparator based on the threshold as adjusted, and/or determines at least one aggregation based on the first digital output signal and the further digital output signal(s).

18 Claims, 10 Drawing Sheets

SYSTEM, METHOD, AND COMPUTER PROGRAM PRODUCT FOR DYNAMIC DETECTION THRESHOLD FOR LiDAR OF AN AUTONOMOUS VEHICLE

BACKGROUND OF THE INVENTION

1. Field of the Invention

This disclosed subject matter relates generally to systems, methods, and computer program products for object detection with Light Detection and Ranging (LiDAR) and, in some non-limiting embodiments or aspects, to a system, method, and computer program product for a dynamic detection threshold for a sensor (e.g., LiDAR) of an autonomous vehicle.

2. Description of the Related Art

Autonomous vehicles rely on various sensors that operate to gather information about an environment in which the vehicle is operating and/or traveling. For example, autonomous vehicles may rely on one or more cameras, one or more ray casting systems (e.g., a LiDAR and/or the like), and/or the like to detect objects. Certain LiDAR systems operate on a time-of-flight principle by measuring the time difference between emission of a signal and detection with a sensor of the signal returning after being reflected by an object.

However, accurate detection of the return of the signal can be difficult. For example, solar radiation, light from other light sources, electrical noise, and/or the like may result in a false detection. Setting detection criteria, such as a threshold, may reduce false detections, but selecting an appropriate threshold can be difficult. For example, if the threshold is too low, false detections may occur (e.g., due to the factors described above). If the threshold is too high, certain objects (e.g., objects with low reflectivity, distant objects, and/or the like) may not be detected (e.g., because the returned signal may not have sufficient power to cause the output of the sensor to exceed the threshold). Moreover, certain sources of noise, such as solar radiation and/or light from other light sources, may vary throughout the day (e.g., based on the time of day, the position of the sun, the location of shade and/or shadows, the state of other light sources being on or off, weather conditions, and/or other environmental factors). As such, setting a threshold that is appropriate for all times of day and environmental conditions can be difficult. In addition, detection based on setting a threshold eliminates information about the returned signal (e.g., amplitude of the retuned signal, the amplitude of the output of the sensor, the amount by which the returned signal exceeds the threshold, and/or the like). Amplitude estimation techniques, such as time over threshold (TOT), are not precise and suffer from issues, such as pulse pileup (e.g., superimposition of multiple pulses and/or the like). Digitization (e.g., with high-speed analog-to-digital converters (ADCs) and/or the like) may be very expensive and generate large amounts of data, most of which is useless, and, depending on the optical technology applied, digitization may require enormous dynamic range. For example, faster photodetectors, such as Silicon Photomultipliers (SiPMs), produce extremely fast and short signal profiles that require extremely high-speed and expensive ADCs.

BRIEF SUMMARY OF THE INVENTION

Accordingly, it is an object of the presently disclosed subject matter to provide systems, methods, and computer program products for a dynamic detection threshold for a sensor (e.g., LiDAR) of an autonomous vehicle that overcome some or all of the deficiencies identified above.

According to non-limiting embodiments or aspects, provided is a system for a dynamic detection threshold for a sensor of an autonomous vehicle. For example, a system may include a LiDAR system of an autonomous vehicle. The LiDAR system may include at least one light emitter configured to emit pulses of light and at least one light detector configured to receive reflected pulses of light and generate analog output signals based on the reflected pulses of light. The reflected pulses of light may include the pulses of light reflected back to the at least one light detector. A comparator may be configured to receive the analog output signals from the light detector and generate digital output signals based on the analog output signals and a threshold. A controller may be configured to receive a first digital output signal of the digital output signals from the comparator based on the threshold, adjust the threshold, receive at least one further digital output signal of the digital output signals from the comparator based on the threshold as adjusted, and/or determine at least one aggregation based on the first digital output signal and the at least one further digital output signal.

In some non-limiting embodiments or aspects, the at least one light emitter may include a plurality of light emitters. Additionally or alternatively, the at least one light detector may include a plurality of light detectors.

In some non-limiting embodiments or aspects, the controller may be further configured to detect at least one object in an environment surrounding the autonomous vehicle based on the at least one aggregation.

In some non-limiting embodiments or aspects, the controller may be further configured to issue at least one command to cause the autonomous vehicle to perform at least one autonomous driving operation based on detecting the at least one object.

In some non-limiting embodiments or aspects, the controller may be further configured to issue at least one command to cause the autonomous vehicle to perform at least one autonomous driving operation based on the at least one aggregation.

In some non-limiting embodiments or aspects, the pulses of light may include a first pulse of light associated with the first digital output signal and at least one further pulse of light associated with the at least one further digital output signal.

In some non-limiting embodiments or aspects, the LiDAR system may be configured to rotate the at least one light emitter and the at least one light detector. A field of view of the LiDAR system may rotate as the at least one light emitter and the at least one light detector rotate. A pulse repetition rate of the pulses of light may be sufficiently high that the field of view when emitting the first pulse of light at least partially overlaps with the field of view when emitting the at least one further pulse of light.

In some non-limiting embodiments or aspects, the at least one further digital output signal may include a plurality of further digital output signals. Additionally or alternatively, adjusting the threshold and receiving the at least one further digital output signal may include repeatedly adjusting the threshold and receiving a respective further digital output signal of the plurality of further digital output signals based on the threshold as adjusted.

In some non-limiting embodiments or aspects, repeatedly adjusting the threshold and receiving the respective further digital output signal of the plurality of further digital output signals based on the threshold as adjusted may include adjusting the threshold according to at least one of a linear search, a low-to-high search, a high-to-low search, a binary search, a sawtooth search, or any combination thereof.

In some non-limiting embodiments or aspects, repeatedly adjusting the threshold and receiving the respective further digital output signal of the plurality of further digital output signals based on the threshold as adjusted may include repeatedly adjusting the threshold according to a first linear search within a first range and/or repeatedly adjusting the threshold according to a second linear search within a second range.

In some non-limiting embodiments or aspects, the second range may be based on a first threshold value within the first range for which the respective further digital output signal is associated with detection of an object and a second threshold value within the first range for which the respective further digital output signal is associated with not detecting the object.

In some non-limiting embodiments or aspects, the threshold may include at least one of a linear value of voltage above a noise voltage level, an exponential value of voltage above the noise voltage level, a value of full width at half maximum, a signal-to-noise ratio (SNR), or any combination thereof.

In some non-limiting embodiments or aspects, the controller may be further configured to determine an approximate amplitude of the analog output signals based on the at least one aggregation.

In some non-limiting embodiments or aspects, the system may further include a time-to-digital converter (TDC) configured to determine at least one time of flight (TOF) based on at least one pulse of light of the pulses of light and at least one reflected pulse of light of the reflected pulses of light.

In some non-limiting embodiments or aspects, the TDC may be configured to receive the at least one aggregation and/or determining the at least one TOF may include determining the at least one TOF based on the at least one aggregation.

In some non-limiting embodiments or aspects, the controller may be further configured to determine a target threshold based on the at least one aggregation.

In some non-limiting embodiments or aspects, the target threshold may include at least one of an optimal threshold value, a threshold value that increases a signal-to-noise ratio (SNR), or any combination thereof.

In some non-limiting embodiments or aspects, the system may further include a digital-to-analog converter (DAC). For example, the DAC may be connected to the controller. In some non-limiting embodiments or aspects, an output of the at least one light detector may be connected to a first comparator input of the comparator, and/or the DAC may be connected to a second comparator input of the comparator. In some non-limiting embodiments or aspects, the controller may be configured to adjust the threshold by controlling the DAC to adjust a voltage at the second comparator input of the comparator.

According to non-limiting embodiments or aspects, provided is a method for a dynamic detection threshold for a sensor of an autonomous vehicle. For example, a method may include emitting, with at least one light emitter of a LiDAR system of an autonomous vehicle, at least one first pulse of light. At least one light detector of the LiDAR system of the autonomous vehicle may receive at least one first reflected pulse of light including the at least one first pulse of light reflected back to the at least one light detector. The at least one light detector may generate at least one first analog output signal based on the at least one first reflected pulse of light. At least one comparator may receive the at least one first analog output signal from the at least one light detector. The at least one comparator may generated at least one first digital output signal based on the at least one first analog output signal and a threshold. At least one controller may receive the at least one first digital output signal from the comparator. The at least one controller may adjust the threshold. The at least one light emitter may emit at least one further pulse of light. The at least one light detector may receive at least one further reflected pulse of light including the at least one further pulse of light reflected back to the at least one light detector. The at least one light detector may generate at least one further analog output signal based on the at least one further reflected pulse of light. The at least one comparator may receive the at least one further analog output signal from the at least one light detector. The at least one comparator may generate at least one further digital output signal based on the at least one further analog output signal and the threshold as adjusted. The at least one controller may receive the at least one further digital output signal from the comparator. The at least one controller may determine at least one aggregation based on the at least one first digital output signal and the at least one further digital output signal.

According to non-limiting embodiments or aspects, provided is a computer program product for a dynamic detection threshold for a sensor of an autonomous vehicle. The computer program product may include at least one non-transitory computer-readable medium including one or more instructions that, when executed by at least one processor, cause the at least one processor to receive at least one first digital output signal from a comparator, the at least one first digital output signal based on a threshold and at least one first analog output signal of at least one light detector of a LiDAR system of an autonomous vehicle. The instructions, when executed by the at least one processor, may further cause the at least one processor to adjust the threshold. The instructions, when executed by the at least one processor, may further cause the at least one processor to receive at least one further digital output signal from the comparator, the at least one further digital output signal based on the threshold as adjusted and at least one further analog output signal of the at least one light detector. The instructions, when executed by the at least one processor, may further cause the at least one processor to determine at least one aggregation based on the at least one first digital output signal and the at least one further digital output signal.

Further embodiments or aspects are set forth in the following numbered clauses:

Clause 1: A system for a dynamic detection threshold for a sensor of an autonomous vehicle, comprising: a LiDAR system of an autonomous vehicle, the LiDAR system comprising at least one light emitter configured to emit pulses of light and at least one light detector configured to receive reflected pulses of light and generate analog output signals based on the reflected pulses of light, the reflected pulses of light comprising the pulses of light reflected back to the at least one light detector; a comparator configured to receive the analog output signals from the light detector and generate digital output signals based on the analog output signals and a threshold; and a controller configured to: receive a first digital output signal of the digital output signals from the comparator based on the threshold; adjust the threshold; receive at least one further digital output signal of the digital output signals from the comparator based on the threshold as adjusted; and determine at least one aggregation based on the first digital output signal and the at least one further digital output signal.

Clause 2: The system of clause 1, wherein the at least one light emitter comprises a plurality of light emitters, and wherein the at least one light detector comprises a plurality of light detectors.

Clause 3: The system of any preceding clause, wherein the controller is further configured to detect at least one object in an environment surrounding the autonomous vehicle based on the at least one aggregation.

Clause 4: The system of any preceding clause, wherein the controller is further configured to issue at least one command to cause the autonomous vehicle to perform at least one autonomous driving operation based on detecting the at least one object.

Clause 5: The system of any preceding clause, wherein the controller is further configured to issue at least one command to cause the autonomous vehicle to perform at least one autonomous driving operation based on the at least one aggregation.

Clause 6: The system of any preceding clause, wherein the pulses of light comprise a first pulse of light associated with the first digital output signal and at least one further pulse of light associated with the at least one further digital output signal.

Clause 7: The system of any preceding clause, wherein the LiDAR system is configured to rotate the at least one light emitter and the at least one light detector, wherein a field of view of the LiDAR system rotates as the at least one light emitter and the at least one light detector rotate, and wherein a pulse repetition rate of the pulses of light is sufficiently high that the field of view when emitting the first pulse of light at least partially overlaps with the field of view when emitting the at least one further pulse of light.

Clause 8: The system of any preceding clause, wherein the at least one further digital output signal comprises a plurality of further digital output signals, and wherein adjusting the threshold and receiving the at least one further digital output signal comprises: repeatedly adjusting the threshold and receiving a respective further digital output signal of the plurality of further digital output signals based on the threshold as adjusted.

Clause 9: The system of any preceding clause, wherein repeatedly adjusting the threshold and receiving the respective further digital output signal of the plurality of further digital output signals based on the threshold as adjusted comprises adjusting the threshold according to at least one of: a linear search; a low-to-high search; a high-to-low search; a binary search; a sawtooth search; or any combination thereof.

Clause 10: The system of any preceding clause, wherein repeatedly adjusting the threshold and receiving the respective further digital output signal of the plurality of further digital output signals based on the threshold as adjusted comprises: repeatedly adjusting the threshold according to a first linear search within a first range; and repeatedly adjusting the threshold according to a second linear search within a second range.

Clause 11: The system of any preceding clause, wherein the second range is based on a first threshold value within the first range for which the respective further digital output signal is associated with detection of an object and a second threshold value within the first range for which the respective further digital output signal is associated with not detecting the object.

Clause 12: The system of any preceding clause, wherein the threshold comprises at least one of: a linear value of voltage above a noise voltage level; an exponential value of voltage above the noise voltage level; a value of full width at half maximum; a signal-to-noise ratio (SNR); or any combination thereof.

Clause 13: The system of any preceding clause, wherein the controller is further configured to determine an approximate amplitude of the analog output signals based on the at least one aggregation.

Clause 14: The system of any preceding clause, further comprising a time-to-digital converter (TDC) configured to determine at least one time of flight (TOF) based on at least one pulse of light of the pulses of light and at least one reflected pulse of light of the reflected pulses of light.

Clause 15: The system of any preceding clause, wherein the TDC is configured to receive the at least one aggregation and wherein determining the at least one TOF comprises determining the at least one TOF based on the at least one aggregation.

Clause 16: The system of any preceding clause, wherein the controller is further configured to determine a target threshold based on the at least one aggregation.

Clause 17: The system of any preceding clause, wherein the target threshold comprises at least one of: an optimal threshold value; a threshold value that increases a signal-to-noise ratio (SNR); or any combination thereof.

Clause 18: The system of any preceding clause, further comprising a digital-to-analog converter (DAC), wherein the DAC is connected to the controller, wherein an output of the at least one light detector is connected to a first comparator input of the comparator, wherein the DAC is connected to a second comparator input of the comparator, and wherein the controller is configured to adjust the threshold by controlling the DAC to adjust a voltage at the second comparator input of the comparator.

Clause 19: A method for a dynamic detection threshold for a sensor of an autonomous vehicle, comprising: emitting, with at least one light emitter of a LiDAR system of an autonomous vehicle, at least one first pulse of light; receiving, with at least one light detector of the LiDAR system of the autonomous vehicle, at least one first reflected pulse of light comprising the at least one first pulse of light reflected back to the at least one light detector; generating, with the at least one light detector, at least one first analog output signal based on the at least one first reflected pulse of light; receiving, with at least one comparator, the at least one first analog output signal from the at least one light detector; generating, with the at least one comparator, at least one first digital output signal based on the at least one first analog output signal and a threshold; receiving, with at least one controller, the at least one first digital output signal from the comparator; adjusting, with the at least one controller, the threshold; emitting, with the at least one light emitter, at least one further pulse of light; receiving, with the at least one light detector, at least one further reflected pulse of light comprising the at least one further pulse of light reflected back to the at least one light detector; generating, with the at least one light detector, at least one further analog output signal based on the at least one further reflected pulse of light; receiving, with the at least one comparator, the at least one further analog output signal from the at least one light detector; generating, with the at least one comparator, at least one further digital output signal based on the at least one further analog output signal and the threshold as adjusted; receiving, with the at least one controller, the at least one further digital output signal from the comparator; and determining, with the at least one controller, at least one aggregation based on the at least one first digital output signal and the at least one further digital output signal.

Clause 20: A computer program product for a dynamic detection threshold for a sensor of an autonomous vehicle, comprising at least one non-transitory computer-readable medium comprising one or more instructions that, when executed by at least one processor, cause the at least one processor to: receive at least one first digital output signal from a comparator, the at least one first digital output signal based on a threshold and at least one first analog output signal of at least one light detector of a LiDAR system of an autonomous vehicle; adjust the threshold; receive at least one further digital output signal from the comparator, the at least one further digital output signal based on the threshold as adjusted and at least one further analog output signal of the at least one light detector; and determine at least one aggregation based on the at least one first digital output signal and the at least one further digital output signal.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular forms of "a," "an," and "the" include plural referents unless the context clearly dictates otherwise.

BRIEF DESCRIPTION OF THE SEVERAL VIEWS OF THE DRAWINGS

Additional advantages and details of the disclosed subject matter are explained in greater detail below with reference to the exemplary embodiments or aspects that are illustrated in the accompanying figures, in which.

DETAILED DESCRIPTION OF THE INVENTION

Figure 1:
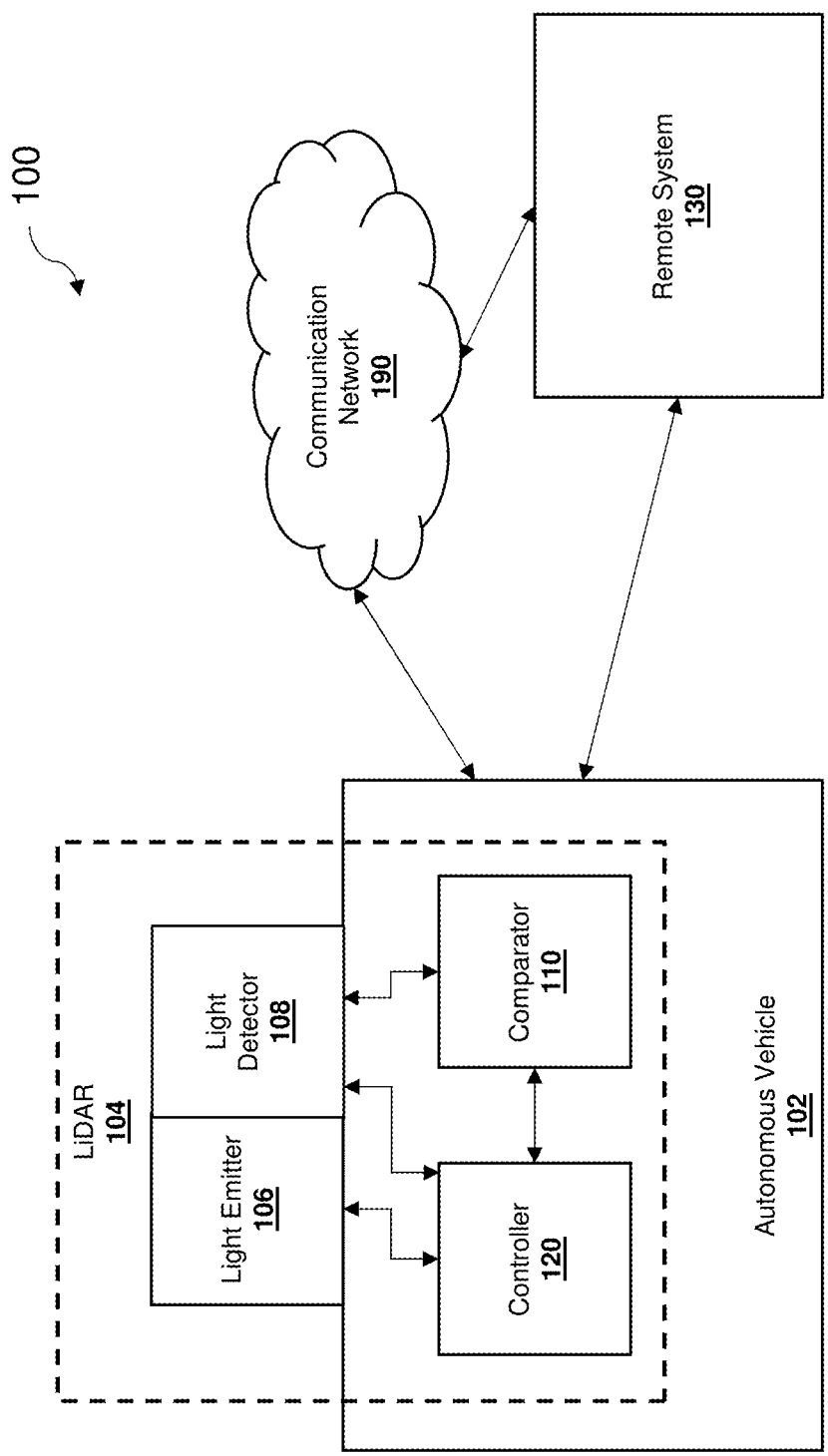
FIG. 1 is a diagram of an exemplary system for a dynamic detection threshold for a sensor (e.g., LiDAR) of an autonomous vehicle, according to some non-limiting embodiments or aspects of the presently disclosed subject matter.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones, and/or the like. An "autonomous vehicle" is a vehicle having a processor, programming instructions, and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the term "server" may refer to one or more computing devices (e.g., processors, storage devices, similar computer components, and/or the like) that communicate with client devices and/or other computing devices over a network (e.g., a public network, the Internet, a private network, and/or the like) and, in some examples, facilitate communication among other servers and/or client devices. It will be appreciated that various other arrangements are possible. As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

As used herein, the term "user interface" or "graphical user interface" may refer to a generated display, such as one or more graphical user interfaces (GUIs) with which a user may interact, either directly or indirectly (e.g., through a keyboard, mouse, touchscreen, etc.).

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Non-limiting embodiments or aspects of the disclosed subject matter are directed to systems and methods for a dynamic detection threshold for a sensor (e.g., LiDAR) of an autonomous vehicle. For example, non-limiting embodiments or aspects of the disclosed subject matter provide systems, methods, and computer program products for a dynamic detection threshold for a sensor (e.g., LiDAR) of an autonomous vehicle, which may include a LiDAR system including at least one light emitter configured to emit pulses of light and at least one light detector configured to receive reflected pulses of light (e.g., the pulses of light reflected back to the light detector) and generate analog output signals based on the reflected pulses of light, a comparator configured to receive the analog output signals from the light detector and generate digital output signals based on the analog output signals and a threshold, and a controller. The controller may be configured to receive a first digital output signal from the comparator based on the threshold, adjust the threshold, receive at least one further digital output signal from the comparator based on the threshold as adjusted, and determine at least one aggregation based on the first digital output signal and the further digital output signal(s). Such embodiments or aspects enable accurate detection of return of the signal (e.g., the reflected pulses returned based on the emitted pulses) based on aggregating multiple digital output signals obtained based on different threshold values (e.g., a threshold that is dynamically adjusted between at least some of the pulses). For example, aggregating multiple digital output signals obtained based on such different threshold values may reduce (e.g., decrease, minimize, eliminate, and/or the like) false detections based on sources of noise, such as solar radiation, light from other light sources, electrical noise, and/or the like, e.g., because if one or a few digital output signals obtained when the threshold is relatively low erroneously indicate detection of an object, but other digital output signals when the threshold is relatively higher indicate an object is not detected, the aggregation(s) may indicate that an object is not detected and/or a low confidence (e.g., probability, confidence score, and/or the like) that an object is detected. Additionally or alternatively, the disclosed embodiments or aspects may reduce the risk of failing to detect certain objects (e.g., objects with low reflectivity, distant objects, and/or the like), for example, because even if one or a few digital output signals when the threshold is relatively high erroneously indicate an object is not detected, but other digital output signals (e.g., multiple separate digital output signals) when the threshold is relatively low indicate an object is detected, the aggregation(s) may indicate that an object is and/or a relatively higher confidence that an object is detected (even though it was only detected at relatively low threshold values) because multiple digital outputs indicated detection of the same object (e.g., as opposed to a single digital output at a single threshold value). Additionally or alternatively, the disclosed embodiments or aspects may reduce the effects of certain sources of noise, such as solar radiation and/or light from other light sources, that may vary throughout the day by using a dynamic threshold with multiple, changing threshold values (e.g., rather than setting a single value for the threshold to be used throughout the day). Additionally or alternatively, non-limiting embodiments or aspects of the disclosed subject matter provide determining an approximate amplitude of the analog output signals based on the aggregation(s). Such embodiments or aspects enable accurately and/or precisely estimating the returned power (e.g., the power of the reflected pulses as represented by the analog output signals) without the need for high-speed analog-to-digital converters (ADCs) (e.g., by using a dynamically adjusted threshold and a comparator) that also reduces the effects of issues that may cause inaccuracy and/or imprecision in other amplitude estimation techniques (e.g., pulse pileup, noise, and/or the like), for example, because multiple digital outputs are aggregated (e.g., rather than relying on a single digital output from what appears to be a single reflected pulse).

For the purpose of illustration, in the following description, while the presently disclosed subject matter is described with respect to systems and methods for a dynamic detection threshold, e.g., for LiDAR of an autonomous vehicle, one skilled in the art will recognize that the disclosed subject matter is not limited to the illustrative embodiments or aspects. For example, the systems and methods described herein may be used with a wide variety of settings, such as a dynamic detection threshold in any setting in which a signal (e.g., emitted signal, reflected signal, returned signal, and/or the like) would be useful, such as radar, sonar, object detection, robotics, computer vision, security systems, and/or the like.

Referring now to FIG. 1, FIG. 1 is a diagram of an exemplary system 100 for a dynamic detection threshold for a sensor (e.g., LiDAR) of an autonomous vehicle, according to some non-limiting embodiments or aspects of the presently disclosed subject matter. As shown in FIG. 1, system 100 may include autonomous vehicle 102, LiDAR system 104, light emitter 106, light detector 108, comparator 110, controller 120, remote system 130, and/or communication network 190.

Autonomous vehicle 102 may include a vehicle, as described herein. In some non-limiting embodiments or aspects, autonomous vehicle 102 may include one or more devices (e.g., controller 120, a vehicle on-board computing device, and/or the like) capable of receiving information from and/or communicating information to remote system 130 (e.g., directly, indirectly via communication network 190, and/or any other suitable communication technique). Additionally or alternatively, each autonomous vehicle 102 may include a device (e.g., controller 120, a vehicle on-board computing device, and/or the like) capable of receiving information from and/or communicating information to other autonomous vehicles 102 (e.g., directly, indirectly via communication network 190, and/or any other suitable communication technique). In some non-limiting embodiments or aspects, autonomous vehicle 102 may include at least one controller 120, such as a vehicle on-board computing device, a portable and/or handheld device (e.g., a computer, a laptop, a personal digital assistant (PDA), a smartphone, a tablet, and/or the like), a field programmable gate array (FPGA), a microcontroller, an application specific integrated circuit (ASIC), a server, and/or other like devices. For example, autonomous vehicle 102 may include at least one computing device (e.g., controller 120, a vehicle on-board computing device, and/or the like) and at least one sensor, such as an image capture system (e.g., a camera and/or the like), a ray casting system (e.g., LiDAR system 104, light emitter 106, light detector 108, a laser scanner, a radar, any combination thereof, and/or the like), any combination thereof, and/or the like, as described herein. In some non-limiting embodiments or aspects, autonomous vehicle 102 (e.g., controller 120 thereof and/or the like) may be configured to generate map data, image data, object detection data, and/or the like based on the sensor(s) (e.g., LiDAR system 104, light emitter 106, light detector 108, and/or the like). In some non-limiting embodiments or aspects, autonomous vehicle 102 may use data from the sensor(s) (e.g., LiDAR system 104, light emitter 106, light detector 108, and/or the like) to facilitate at least one autonomous driving operation of the autonomous vehicle 102, as described herein. In some non-limiting embodiments or aspects, autonomous vehicle 102 may detect at least one object using the sensor(s) onboard the vehicle (e.g., using LiDAR system 104, light emitter 106, light detector 108, and/or the like).

LiDAR system 104 may include at least one LiDAR system, as described herein. For example, LiDAR system 104 may be the same as or substantially similar to LiDAR system 264 of FIG. 2, LiDAR system 300 of FIG. 3, and/or the like. In some non-limiting embodiments or aspects, LiDAR system 104 may include at least one light emitter 106 (e.g., a plurality of light emitters 106) and/or at least one light detector 108 (e.g., a plurality of light detectors 108), as described herein. In some non-limiting embodiments or aspects, LiDAR system 104 may include at least one of comparator 110 and/or controller 120. Additionally or alternatively, at least one of (e.g., both of) comparator 110 and/or controller 120 may be separate from and/or connected to (e.g., in communication with) LiDAR system 104. In some non-limiting embodiments or aspects, LiDAR system 104 may be part of autonomous vehicle 102. In some non-limiting embodiments or aspects, LiDAR system 104 may include a device capable of receiving information from and/or communicating information to other sensors, as described herein.

Light emitter 106 may include at least one light emitter configured and positioned to generate and emit pulses of light, as described herein. For example, light emitter 106 may be the same as or substantially similar to emitter system 304 of FIG. 3 and/or the like. In some non-limiting embodiments or aspects, light emitter 106 may be part of LiDAR system 104 and/or autonomous vehicle 102. For example, LiDAR system 104 may include any number of light emitters 106 (e.g., 8 emitters, 64 emitters, 128 emitters, etc.).

Light detector 108 may include at least one light detector (e.g., a photodetector and/or the like) positioned and configured to receive light reflected back into the system, as described herein. For example, light detector 108 may be the same as or substantially similar to light detector 308 of FIG. 3 and/or the like. In some non-limiting embodiments or aspects, light detector 108 may be part of LiDAR system 104 and/or autonomous vehicle 102. For example, LiDAR system 104 may include any number of light detector 108. In some non-limiting embodiments or aspects, light detector 108 may include at least one photodetector, such as a Silicon Photomultiplier (SiPM), an avalanche photodiode (APD), a single-photon avalanche diode (SPAD), a photodiode, and/or the like. For example, light detector 108 may include a SiPM, which may produce a fast and short signal profile (e.g., upon receiving a reflected pulse of light). In some non-limiting embodiments or aspects, light detector 108 may be configured to generate analog output signals based on receiving light (e.g., reflected pulses of light).

Comparator 110 may include at least one comparator, such as a differential comparator, a differential amplifier, an operational amplifier (op-amp), and/or the like. In some non-limiting embodiments or aspects, comparator 110 may be configured to receive the outputs (e.g., analog output signals) from light detector 108. For example, an output of light detector 108 may be connected to a first comparator input (e.g., a positive comparator input, a negative comparator input, and/or the like) of comparator 110. In some non-limiting embodiments or aspects, comparator 110 may be configured to generate digital output signals based on the analog output signals and a threshold. For example, a second comparator input (e.g., a negative comparator input, a positive comparator input, and/or the like) may be connected (e.g., directly, indirectly via a digital-to-analog converter (DAC), and/or the like) to controller 120, and a signal (e.g., a threshold signal, such as a voltage, a current, and/or the like) provided at the second comparator input (e.g., from controller 120, the DAC, and/or the like) may be associated with the threshold. Comparator 110 may compare the signals (e.g., the analog output signal at the first comparator input and the threshold signal at the second comparator input) and generate the digital output signal based thereon (e.g., a high digital output signal (e.g., 1) if the voltage, current, and/or the like of the analog output signal at the first comparator input is greater than the voltage, current, and/or the like of the threshold signal at the second comparator input; a low digital output signal (e.g., 0) if the voltage, current, and/or the like of the analog output signal at the first comparator input is less than the voltage, current, and/or the like of the threshold signal at the second comparator input; and/or the like). In some non-limiting embodiments or aspects, controller 120 may adjust the threshold by adjusting (and/or cause the DAC to adjust) the threshold signal at the second comparator input. In some non-limiting embodiments or aspects, comparator 110 may be part of at least one of LiDAR system 104 and/or controller 120. In some non-limiting embodiments or aspects, comparator 110 may separate from (and be connected to) at least one of (e.g., both of) LiDAR 104 and/or controller 120. In some non-limiting embodiments or aspects, comparator 108 may be part of autonomous vehicle 102. In some non-limiting embodiments or aspects, a plurality of comparators 110 may be included. For example, autonomous vehicle 102 and/or LiDAR system 104 may include a respective comparator 110 for each respective light detector 108.

Controller 120 may include one or more devices capable of receiving information from and/or communicating information to autonomous vehicle 102, LiDAR system 104, light emitter 106, light detector 108, comparator 110, and/or remote system 130 (e.g., directly, indirectly via communication network 190, and/or any other suitable communication technique). In some non-limiting embodiments or aspects, controller 120 may include at least one computing device, such as a vehicle on-board computing device, an FPGA, a microcontroller, an ASIC, a portable and/or handheld device (e.g., a computer, a laptop, a personal digital assistant (PDA), a smartphone, a tablet, and/or the like), a server, and/or other like devices. For example, controller 120 may include a vehicle on-board computing device, as described herein. Additionally or alternatively, controller 120 may include at least one of a processor, an FPGA, a microcontroller, an ASIC, any combination thereof, and/or the like (e.g., connected to and/or in communication with the vehicle on-board computing device of autonomous vehicle 102). In some non-limiting embodiments or aspects, controller 120 may be part of autonomous vehicle 102. In some non-limiting embodiments or aspects, controller 120 may be part of LiDAR system 104. In some non-limiting embodiments or aspects, controller 120 may be separate from, connected to, and/or in communication with LiDAR system 104.

Remote system 130 may include one or more devices capable of receiving information from and/or communicating information to autonomous vehicle 102 (e.g., a computing device thereof, controller 120 thereof, and/or the like) and/or controller 120 (e.g., directly, indirectly via communication network 190, and/or any other suitable communication technique). In some non-limiting embodiments or aspects, remote system 130 may include at least one computing device, such as a server, a group of servers, a portable and/or handheld device (e.g., a computer, a laptop, a personal digital assistant (PDA), a smartphone, a tablet, and/or the like), and/or other like devices. In some non-limiting embodiments or aspects, remote system 130 may include at least one of a remote guidance system, a mapping system, a tracking system tracking the location of one or more autonomous vehicles, a logging system maintaining records for potential liability, and/or the like.

Communication network 190 may include one or more wired and/or wireless networks. For example, communication network 190 may include a cellular network (e.g., a long-term evolution (LTE) network, a third generation (3G) network, a fourth generation (4G) network, a fifth generation (5G) network, a code division multiple access (CDMA) network, and/or the like), a public land mobile network (PLMN), a local area network (LAN), a wireless LAN (WLAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

In some non-limiting embodiments or aspects, LiDAR system 104 (e.g., of autonomous vehicle 102) may include at least one light emitter 106 and at least one light detector 108. For example, light emitter 106 may be configured to emit pulses of light, as described herein, and light detector 108 may be configured to receive reflected pulses of light (e.g., the pulses of light from light emitter 106 reflected back to light detector 108), as described herein. Light detector 108 may be configured to generate analog output signals based on the reflected pulses of light, as described herein. Comparator 110 may be configured to receive the analog output signals from light detector 108 and generate digital output signals based on the analog output signals and a threshold, as described herein. Controller 120 may be configured to repeatedly (e.g., continuously, periodically, and/or the like) receive digital output signals from comparator 110 based on the threshold and/or adjust the threshold, as described herein. For example, controller 120 may receive at least one digital output signal from comparator 110 based on the threshold, adjust the threshold, and receive at least one further digital output signal from comparator 110 based on the threshold as adjusted. Controller 120 may be further configured to determine at least one aggregation based on the digital output signals based on the different thresholds (e.g., the digital output signal(s) based on the initial threshold value, the further digital output signal(s) based on the adjusted threshold value, etc.), as described herein. For example, the aggregation(s) may include at least one statistic based on the digital output signals (e.g., for the different thresholds).

In some non-limiting embodiments or aspects, a plurality of light emitters 106 may be included. Additionally or alternatively, a plurality of light detectors 108 may be included.

In some non-limiting embodiments or aspects, controller 120 may be further configured to detect at least one object in an environment surrounding autonomous vehicle 102 based on the aggregation(s). In some non-limiting embodiments or aspects, controller 120 may be further configured to issue at least one command to cause autonomous vehicle 102 to perform at least one autonomous driving operation (e.g., brake, steer, accelerate, and/or the like) based on at least one of the aggregation(s) and/or detecting the object(s).

In some non-limiting embodiments or aspects, the pulses of light from light emitter 106 may include a first pulse of light associated with a first digital output from comparator 110 (e.g., a first pulse of light being emitted by light emitter 106, being reflected back to light detector 108, causing generation of a first analog output signal from light detector 108, and causing generation of the first digital output from comparator 110). Additionally or alternatively, at least one further pulse of light from emitter 106 may be associated with the at least one further digital output from comparator 110. In some non-limiting embodiments or aspects, LiDAR system 104 may be configured to rotate light emitter 106 and light detector 108 so that a field of view of LiDAR system 104 rotates as light emitter 106 and light detector 108 rotate. In some non-limiting embodiments or aspects, a pulse repetition rate of the pulses of light from light emitter 106 may be sufficiently high that the field of view when emitting the first pulse of light at least partially overlaps with the field of view when emitting the further pulse(s) of light.

In some non-limiting embodiments or aspects, controller 120 may repeatedly (e.g., dynamically, periodically, and/or the like) adjust the threshold and receive one or more respective digital output signal(s) based on the threshold as adjusted (e.g., for each threshold value). For example, controller 120 may adjust the threshold according to at least one of a linear search, a low-to-high search, a high-to-low search, a binary search, a sawtooth search, a biased search algorithm, any combination thereof, any other suitable search algorithm or search pattern, and/or the like. For the purpose of illustration and not limitation, a range (e.g., first range) may include a range from 0 volts (V) (or the minimum output voltage of light detector 108) to a maximum voltage of light detector 108. A linear search may include sequentially adjusting the threshold to each possible value (or a subset of discrete values) in the range (e.g., 10% of the maximum voltage, 20% of the maximum voltage, 30% of the maximum voltage, 40% of the maximum voltage, 50% of the maximum voltage, 60% of the maximum voltage, 70% of the maximum voltage, 80% of the maximum voltage, 90% of the maximum voltage, and/or the like) and receiving at least one digital output signal at each of the aforementioned threshold values. A low-to-high search may include a linear search starting from the lowest value in the range (and/or the lowest discrete value in the subset of discrete values in the range) and sequentially increasing the threshold to each value until reaching the highest value. A high-to-low search may include a linear search starting from the highest value in the range (and/or the highest discrete value in the subset of discrete values in the range) and sequentially decreasing the threshold to each value until reaching the lowest value. A binary search may include starting from a value in a middle of the range (e.g., 50% of the maximum voltage), receiving at least one digital output signal at that threshold value, eliminating half the range based on the digital output signal (e.g., eliminating the lower half of the range if the digital output signal is high (e.g., 1) or eliminating the upper half of the range if the digital output signal is low (e.g., 0)), and repeatedly adjusting the threshold to the center of the remaining portion of the range and receiving at least one digital output signal at that adjusted threshold to repeatedly discard half of the range until a termination condition is satisfied (e.g., a predetermined number of repetitions, a threshold value above a maximum target value, a threshold value below a minimum target value, and/or the like). A sawtooth search may be similar to a linear search (e.g., low-to-high search or high-to-low search), but after reaching the end of the range, the search starts again from the beginning of the range. A biased search algorithm may account for false positives (e.g., at low threshold values and/or at low signal-to-noise ratio (SNR) levels).

In some non-limiting embodiments or aspects, controller 120 may repeatedly adjust the threshold according to a first linear search within a first range, as described herein. Thereafter, controller 120 may repeatedly adjust the threshold according to a second linear search within a second range. For example, the second range may be based on a first threshold value within the first range for which the respective digital output signal is associated with detection of an object (e.g., a high digital output signal) and a second threshold value within the first range for which the respective further digital output signal is associated with not detecting an object (e.g., a low digital output signal).

In some non-limiting embodiments or aspects, the threshold may include at least one of a voltage value, a current value, a linear value of voltage above a noise voltage level, an exponential value of voltage above the noise level, a value of full width at half maximum (e.g., of the analog output signal), an SNR, a peak intensity (e.g., peak voltage intensity, peak current intensity, and/or the like), a pulse energy, any combination thereof, and/or the like.

In some non-limiting embodiments or aspects, the at least one aggregation(s) may include at least one of a maximum threshold value for which the respective digital output signal is associated with detection of an object (e.g., a high digital output signal, such as 1), a minimum threshold value for which the respective digital output is associated with not detecting an object (e.g., a low digital output signal, such as 0), an average value of the respective digital outputs for each threshold value, an average time of flight (TOF) for each threshold value, an average time over threshold (TOT) for each threshold value, a time-based aggregation (e.g., a sum of values from previous pulses for a window of time and the value for the current pulse, a rolling window of values (e.g., a sum thereof), a running sum of values, a running attenuated sum of values, and/or the like), a time-domain aggregation (e.g., pseudo-binary time-of-detection, value-of-threshold-tripped, and/or the like) any combination thereof, and/or the like.

In some non-limiting embodiments or aspects, controller 120 may be further configured to determine an approximate amplitude of the analog output signals based on the aggregation(s). For example, controller 120 may determine an approximate amplitude of the analog output signals based on at least one of a maximum threshold value for which the respective digital output signal is associated with detection of an object (e.g., a high digital output signal, such as 1), a minimum threshold value for which the respective digital output is associated with not detecting an object (e.g., a low digital output signal, such as 0), a TOT (e.g., for at least one of the aforementioned threshold values, such as the maximum threshold value for which the respective digital output signal is associated with a detection), any combination thereof, and/or the like.

In some non-limiting embodiments or aspects, a time-to-digital converter (TDC) may be configured to determine at least one TOF based on at least one pulse of light of the pulses of light and at least one reflected pulse of light of the reflected pulses of light. For example, the TDC may be configured to receive the aggregation(s), and determining the TOF may include determining the TOF based on the aggregation(s). In some non-limiting embodiments or aspects, the TDC may be implemented by (e.g., part of) controller 120. In some non-limiting embodiments or aspects, the TDC may be separate from controller 120 and/or implemented (e.g., completely, partially, and/or the like) by another computing device separate from or including controller 120, such as a vehicle on-board computing device of autonomous vehicle 102 and/or the like.

In some non-limiting embodiments or aspects, controller 120 may be further configured to determine a target threshold based on the aggregation(s). For example, the target threshold may include at least one of an optimal threshold value, a threshold value that increases an SNR, a threshold value that reduces false detections, a threshold that increases detections of certain objects (e.g., low-reflectivity objects), any combination thereof, and/or the like.

In some non-limiting embodiments or aspects, a digital-to-analog converter (DAC) may be included. For example, the DAC may be implemented by (e.g., part of) controller 120. Additionally or alternatively, the DAC may be separate from controller 120 and/or implemented (e.g., completely, partially, and/or the like) by another computing device separate from or including controller 120, such as a vehicle on-board computing device of autonomous vehicle 102 and/or the like. In some non-limiting embodiments or aspects, the DAC may be connected to controller 120. For example, an output of light detector 108 may be connected to a first comparator input of comparator 110, and the DAC may be connected to a second comparator input of comparator 110. Controller 120 may be configured to adjust the threshold by controlling the DAC to adjust a voltage at the second comparator input of the comparator 110.

The number and arrangement of systems, devices, sensors, components, and/or networks shown in FIG. 1 are provided as an example. There may be additional systems, devices, sensors, components, and/or networks; fewer systems, devices, sensors, components, and/or networks; different systems, devices, sensors, components, and/or networks; and/or differently arranged systems, devices, sensors, components, and/or networks than those shown in FIG. 1. Furthermore, two or more systems, devices, sensors, or components shown in FIG. 1 may be implemented within a single system, device, sensor, or components, or a single system, device, sensor, or component shown in FIG. 1 may be implemented as multiple, distributed systems, devices, sensors, or components. Additionally or alternatively, a set of systems (e.g., one or more systems), a set of devices (e.g., one or more devices), a set of sensors (e.g., one or more sensors), or a set of components (e.g., one or more components) of system 100 may perform one or more functions described as being performed by another set of systems, another set of devices, another set of sensors, or another set of components of system 100.

Figure 2:
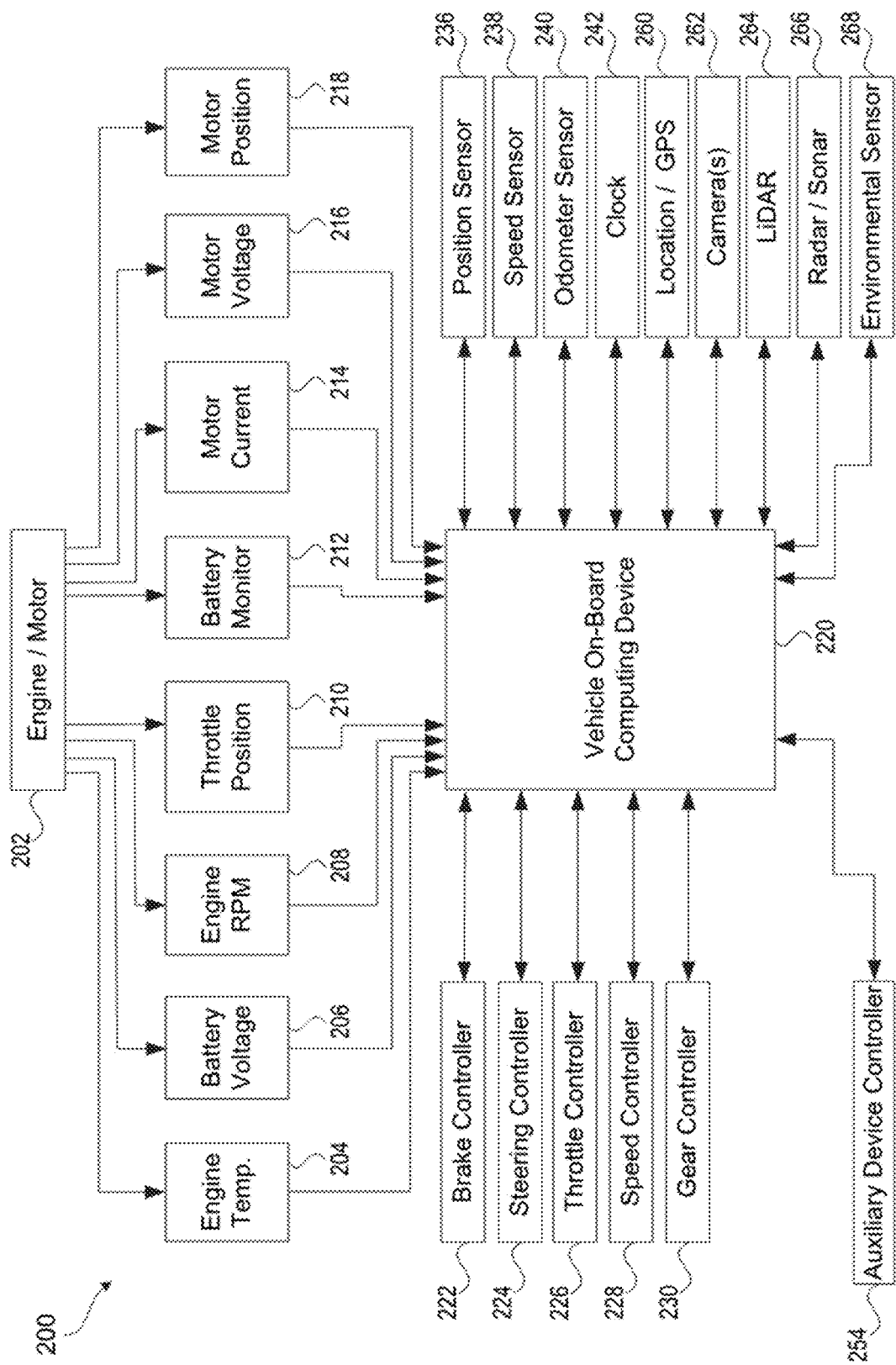
FIG. 2 is an illustration of an illustrative architecture for a vehicle, according to some non-limiting embodiments or aspects of the presently disclosed subject matter.

Referring now to FIG. 2, FIG. 2 is an illustration of an illustrative system architecture 200 for a vehicle, according to some non-limiting embodiments or aspects of the presently disclosed subject matter. In some non-limiting embodiments or aspects, autonomous vehicle 102 may include a same or similar system architecture as that of system architecture 200 shown in FIG. 2. In some non-limiting embodiments or aspects, comparator 110 and/or controller 120 may be the same as, similar to, or part of vehicle on-board computing device 220. In some non-limiting embodiments or aspects, light emitter 106, light detector 108, comparator 110, and/or controller 120 may be part of or connected to LiDAR 264. In some non-limiting embodiments or aspects, LiDAR system 104 may be the same as or similar to LiDAR 264.

The number and arrangement of components shown in FIG. 2 are provided as an example. In some non-limiting embodiments or aspects, system architecture 200 may include additional components, fewer components, different components, or differently arranged components than those shown in FIG. 2. Additionally, or alternatively, a set of components (e.g., one or more components) of system architecture 200 may perform one or more functions described as being performed by another set of components of system architecture 200.

As shown in FIG. 2, system architecture 200 may include engine or motor 202 and various sensors 204-218 for measuring various parameters of the vehicle. In gas-powered or hybrid vehicles having a fuel-powered engine 202, the sensors may include, for example, engine temperature sensor 204, battery voltage sensor 206, engine rotations per minute (RPM) sensor 208, and/or throttle position sensor 210. In an electric or hybrid vehicle, the vehicle may have an electric motor 202, and may have sensors such as battery monitoring sensor 212 (e.g., to measure current, voltage, and/or temperature of the battery), motor current sensor 214, motor voltage sensor 216, and/or motor position sensors 218, such as resolvers and encoders.

System architecture 200 may include operational parameter sensors, which may be common to both types of vehicles, and may include, for example: position sensor 236 such as an accelerometer, gyroscope, and/or inertial measurement unit; speed sensor 238; and/or odometer sensor 240. System architecture 200 may include clock 242 that the system architecture 200 uses to determine vehicle time during operation. Clock 242 may be encoded into the vehicle on-board computing device 220, it may be a separate device, or multiple clocks may be available.

System architecture 200 may include various sensors that operate to gather information about an environment in which the vehicle is operating and/or traveling. These sensors may include, for example: location sensor 260 (e.g., a Global Positioning System (GPS) device); object detection sensors such as one or more cameras 262; LiDAR sensor system 264; and/or radar and/or sonar system 266. The sensors may include environmental sensors 268, such as a precipitation sensor and/or ambient temperature sensor. The object detection sensors may enable the system architecture 200 to detect objects that are within a given distance range of the vehicle in any direction, and the environmental sensors 268 may collect data about environmental conditions within an area of operation and/or travel of the vehicle.

During operation of system architecture 200, information is communicated from the sensors of system architecture 200 to on-board computing device 220. The on-board computing device 220 may be implemented using the computer system of FIG. 3. Vehicle on-board computing device 220 analyzes the data captured by the sensors and optionally controls operations of the vehicle based on results of the analysis. For example, vehicle on-board computing device 220 may control: braking via a brake controller 222; direction via steering controller 224; speed and acceleration via throttle controller 226 (e.g., in a gas-powered vehicle) or motor speed controller 228 such as a current level controller (e.g., in an electric vehicle); differential gear controller 230 (e.g., in vehicles with transmissions); and/or other controllers such as auxiliary device controller 254.

Geographic location information may be communicated from location sensor 260 to vehicle on-board computing device 220, which may access a map of the environment including map data that corresponds to the location information to determine known fixed features of the environment, such as streets, buildings, stop signs, and/or stop/go signals. Captured images from cameras 262 and/or object detection information captured from sensors, such as LiDAR sensor system 264 and/or radar and/or sonar system 266, is communicated from those sensors to vehicle on-board computing device 220. The object detection information and/or captured images are processed by on-board computing device 220 to detect objects in proximity to the vehicle. Any known or to be known techniques for making an object detection based on sensor data and/or captured images can be used in the embodiments or aspects disclosed in this document. Vehicle on-board computing device 220 may generate new map data (e.g., based on object detection data captured from sensors such as LiDAR 264, captured images from cameras 262, the map data, and/or the like). Additionally or alternatively, vehicle on-board computing device 220 may communicate sensor data (e.g., object detection data captured from sensors such as LiDAR 264, captured images from cameras 262, and/or the like) to a remote system (e.g., remote system 119), which may generate new map data based on the sensor data.

Figure 3:
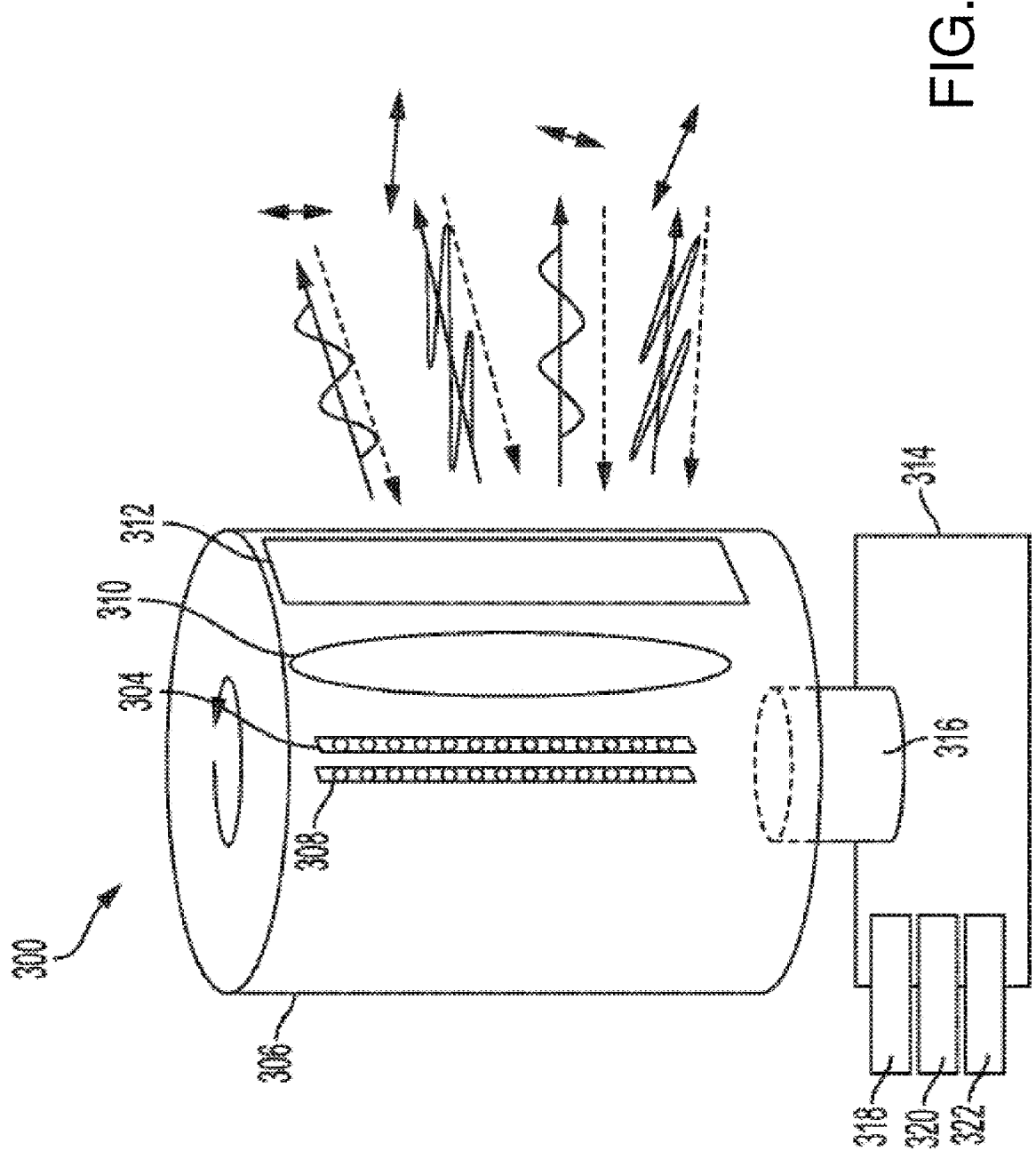
FIG. 3 is an illustration of an illustrative architecture for a LiDAR system, according to the principles of the presently disclosed subject matter.

Referring now to FIG. 3, FIG. 3 is an illustration of an illustrative LiDAR system 300. In some non-limiting embodiments or aspects, LiDAR system 104 of FIG. 1 and/or LiDAR 264 of FIG. 2 may be the same as or substantially similar to LiDAR system 300. In some non-limiting embodiments or aspects, light emitter 106 and/or light detector 108 may be the same as or similar to light emitter system 304 and/or light detector 308, respectively.

As shown in FIG. 3, LiDAR system 300 may include housing 306, which may be rotatable 360° about a central axis, such as hub or axle 316. Housing 306 may include an emitter/receiver aperture 312 made of a material transparent to light. Although a single aperture is shown in FIG. 3, non-limiting embodiments or aspects of the present disclosure are not limited in this regard. In other scenarios, multiple apertures for emitting and/or receiving light may be provided. Either way, LiDAR system 300 can emit light through one or more of aperture(s) 312 and receive reflected light back toward one or more of aperture(s) 312 as housing 306 rotates around the internal components. In an alternative scenario, the outer shell of housing 306 may be a stationary dome, at least partially made of a material that is transparent to light, with rotatable components inside of housing 306.

Inside the rotating shell or stationary dome is a light emitter system 304 that is configured and positioned to generate and emit pulses of light through aperture 312 or through the transparent dome of housing 306 via one or more laser emitter chips or other light emitting devices. Light emitter system 304 may include any number of individual emitters (e.g., 8 emitters, 64 emitters, 128 emitters, etc.). The emitters may emit light of substantially the same intensity or of varying intensities. The individual beams emitted by light emitter system 304 may have a well-defined state of polarization that is not the same across the entire array. As an example, some beams may have vertical polarization and other beams may have horizontal polarization. LiDAR system 300 may include light detector 308 containing a photodetector or array of photodetectors positioned and configured to receive light reflected back into the system. Light emitter system 304 and light detector 308 may rotate with the rotating shell, or light emitter system 304 and light detector 308 may rotate inside the stationary dome of housing 306. One or more optical element structures 310 may be positioned in front of light emitter system 304 and/or light detector 308 to serve as one or more lenses and/or waveplates that focus and direct light that is passed through optical element structure 310.

One or more optical element structures 310 may be positioned in front of a mirror to focus and direct light that is passed through optical element structure 310. As described herein below, LiDAR system 300 may include optical element structure 310 positioned in front of a mirror and connected to the rotating elements of LiDAR system 300 so that optical element structure 310 rotates with the mirror. Alternatively or in addition, optical element structure 310 may include multiple such structures (e.g., lenses, waveplates, etc.). In some non-limiting embodiments or aspects, multiple optical element structures 310 may be arranged in an array on or integral with the shell portion of housing 306.

In some non-limiting embodiments or aspects, each optical element structure 310 may include a beam splitter that separates light that the system receives from light that the system generates. The beam splitter may include, for example, a quarter-wave or half-wave waveplate to perform the separation and ensure that received light is directed to the receiver unit rather than to the emitter system (which could occur without such a waveplate as the emitted light and received light should exhibit the same or similar polarizations).

LiDAR system 300 may include power unit 318 to power the light emitter system 304, motor 316, and electronic components. LiDAR system 300 may include an analyzer 314 with elements such as processor 322 and non-transitory computer-readable memory 320 containing programming instructions that are configured to enable the LiDAR system 300 to receive data collected by the light detector unit, analyze the data to measure characteristics of the light received, and generate information that a connected system can use to make decisions about operating in an environment from which the data was collected. Analyzer 314 may be integral with the LiDAR system 300 as shown, or some or all of analyzer 314 may be external to LiDAR system 300 and communicatively connected to LiDAR system 300 via a wired and/or wireless communication network or link.

Figure 4:
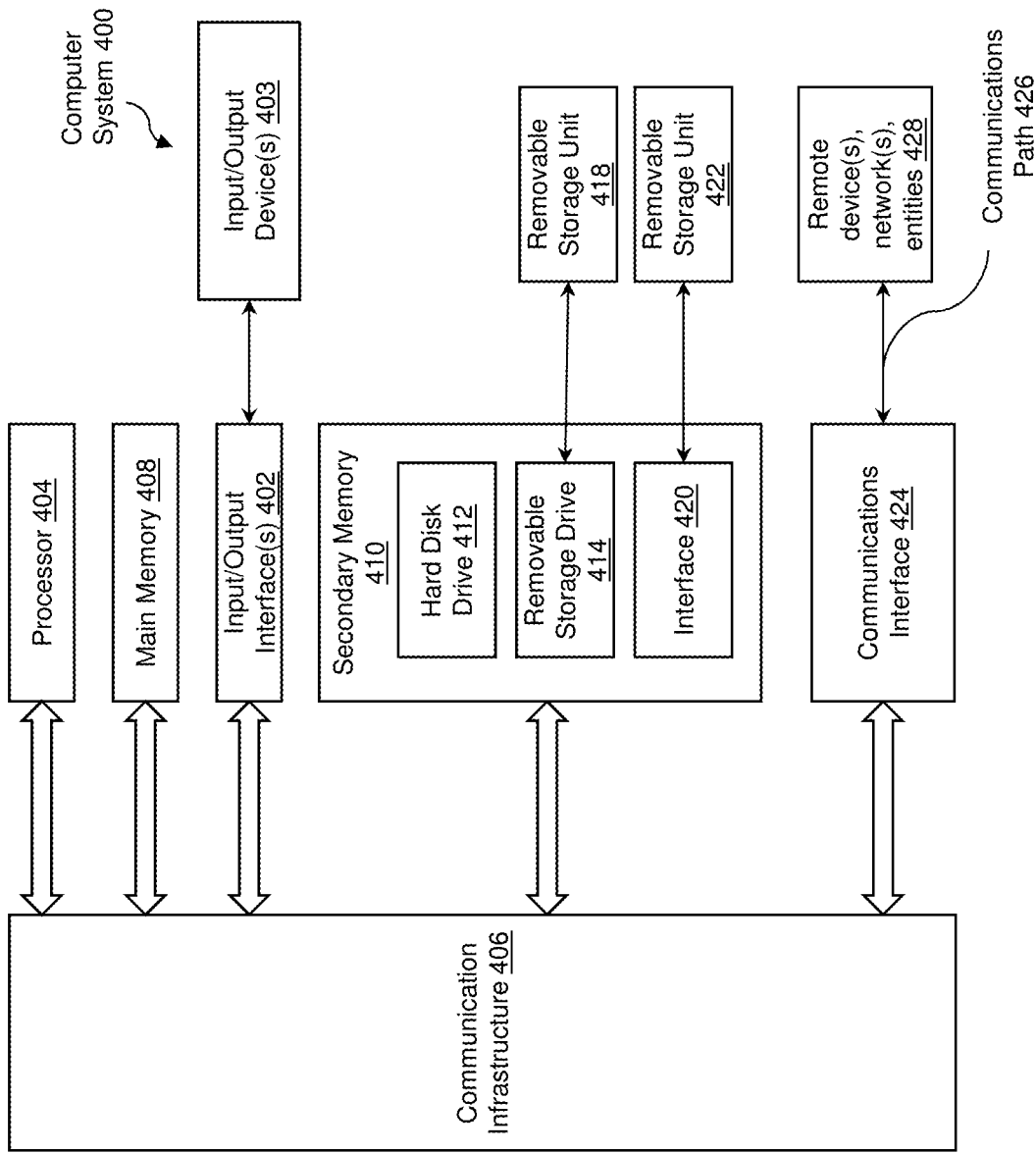
FIG. 4 is an illustration of an illustrative computer system, according to some non-limiting embodiments or aspects of the presently disclosed subject matter.

Various embodiments or aspects can be implemented, for example, using one or more computer systems, such as computer system 400 shown in FIG. 4. Computer system 400 can correspond to one or more devices of (e.g., one or more devices of a system of) autonomous vehicle 102, controller 120, and/or remote system 130. In some non-limiting embodiments or aspects, one or more devices of (e.g., one or more devices of a system of) autonomous vehicle 102, controller 120, and/or remote system 130 may include at least one computer system 400 and/or at least one component of computer system 400. Computer system 400 can be any computer capable of performing the functions described herein.

In some non-limiting embodiments or aspects, computer system 400 may be any computer capable of performing the functions described herein.

Computer system 400 may include one or more processors (also called central processing units, or CPUs), such as a processor 404. Processor 404 is connected to a communication infrastructure or bus 406.

One or more processors 404 may each be a graphics processing unit (GPU). In some non-limiting embodiments or aspects, a GPU may include a processor that is a specialized electronic circuit designed to process mathematically intensive applications. The GPU may have a parallel structure that is efficient for parallel processing of large blocks of data, such as mathematically intensive data common to computer graphics applications, images, videos, etc. In some non-limiting embodiments or aspects, one or more processors 404 (e.g., CPU, GPU, and/or the like) may include, be part of, and/or be connected to one or more hardware accelerators. For example, a hardware accelerator may include an artificial intelligence (AI) accelerator.

Computer system 400 also may include input/output device(s) 403 (e.g., user input/output device(s), such as monitors, keyboards, pointing devices, etc.), that communicate with communication infrastructure 406 through input/output interface(s) 402 (e.g., user input/output interface(s)).

Computer system 400 also may include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, removable solid state drive (SSD), removable hard disk drive, and/or any other computer data storage device. Removable storage drive 414 reads from and/or writes to removable storage unit 418 in any suitable manner.

In some non-limiting embodiments or aspects, secondary memory 410 may include other means, instrumentalities, or other approaches for allowing computer programs and/or other instructions and/or data to be accessed by computer system 400. Such means, instrumentalities, or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In some non-limiting embodiments or aspects, a tangible, non-transitory apparatus or article of manufacture comprising a tangible, non-transitory computer useable or readable medium having control logic (software) stored thereon also may be referred to herein as a computer program product or program storage device. This may include, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

The number and arrangement of components shown in FIG. 4 are provided as an example. In some non-limiting embodiments or aspects, computer system 400 may include additional components, fewer components, different components, or differently arranged components than those shown in FIG. 4. Additionally, or alternatively, a set of components (e.g., one or more components) of computer system 400 may perform one or more functions described as being performed by another set of components of computer system 400.

Figure 5:
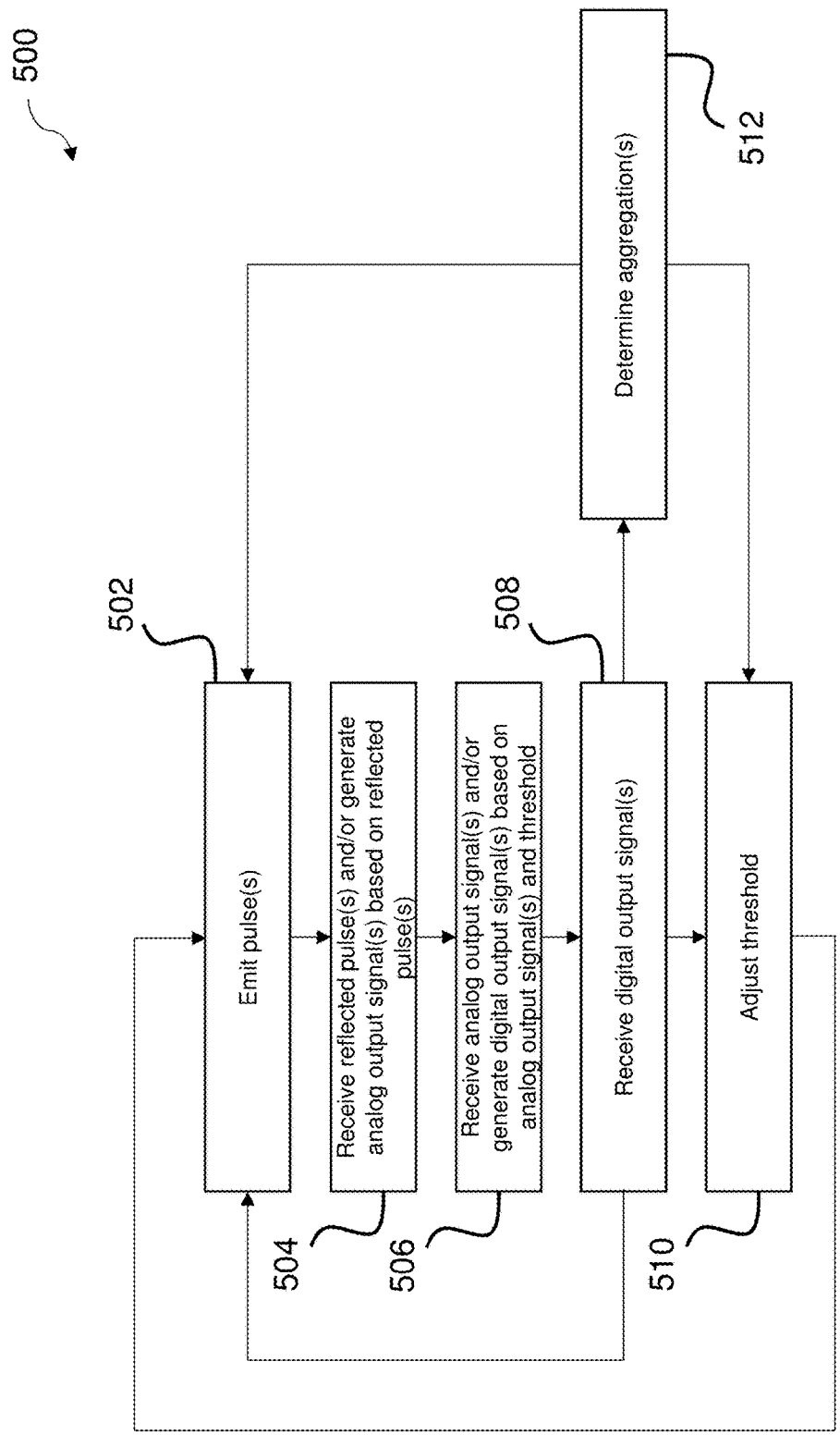
FIG. 5 is a flowchart of an exemplary process for a dynamic detection threshold for a sensor (e.g., LiDAR) of an autonomous vehicle, according to some non-limiting embodiments or aspects of the presently disclosed subject matter.

Referring now to FIG. 5, FIG. 5 is a flowchart of a non-limiting embodiment or aspect of a process 500 for a dynamic detection threshold for a sensor (e.g., LiDAR) of an autonomous vehicle, according to some non-limiting embodiments or aspects of the presently disclosed subject matter. In some non-limiting embodiments or aspects, one or more of the steps of process 500 may be performed (e.g., completely, partially, and/or the like) by controller 120. In some non-limiting embodiments or aspects, one or more of the steps of process 500 may be performed (e.g., completely, partially, and/or the like) by another system, another device, another group of systems, or another group of devices, separate from or including controller 120, such as LiDAR system 104, light emitter 106, light detector 108, comparator 110, remote system 130, and/or the like. The number and arrangement of steps shown in FIG. 5 are provided as an example. In some non-limiting embodiments or aspects, process 500 may include additional steps, fewer steps, different steps, or differently arranged steps than those shown in FIG. 5.

As shown in FIG. 5, at step 502, process 500 may include emitting at least one pulse. For example, light emitter 106 may emit at least one pulse of light, as described herein. In some non-limiting embodiments or aspects, controller 120 may control light emitter 106 to emit the pulse(s) of light.

In some non-limiting embodiments or aspects, a plurality of light emitters 106 may emit a plurality of pulses of light (e.g., simultaneously, sequentially, independently, and/or the like), as described herein.

As shown in FIG. 5, at step 504, process 500 may include receiving at least one reflected pulse and/or generating at least one analog output signal based on the reflected pulse(s). For example, light detector 108 may receive at least one reflected pulse of light, as described herein. Additionally or alternatively, light detector 108 may generate at least one analog output signal based on the reflected pulse(s) of light, as described herein. In some non-limiting embodiments or aspects, the reflected pulse(s) of light may include the pulses of light (e.g., emitted from light emitter 108) reflected back to LiDAR system 104 and/or light detector 108.

In some non-limiting embodiments or aspects, a plurality of light detectors 108 may receive at least one reflected pulse of light (e.g., a plurality of reflected pulses of light), as described herein. In some non-limiting embodiments or aspects, the light detectors 108 may generate at least one analog output signal (e.g., a plurality of analog output signals) based on the reflected pulse(s) of light.

As shown in FIG. 5, at step 506, process 500 may include receiving at least one analog output signal and/or generating at least one digital output signal based on the analog output signal(s) and a threshold. For example, comparator 110 may receive the analog output signal(s) from light detector 108, as described herein. Additionally or alternatively, comparator 110 may generate at least one digital output signal based on the analog output signal(s) and a threshold, as described herein.

In some non-limiting embodiments or aspects, a plurality of comparators 110 (e.g., one comparator 110 for each light detector 108 and/or the like) may receive a plurality of analog output signals from a plurality of light detectors 108. Additionally or alternatively, each comparator 110 may generate a respective digital output signal based on the respective analog output signal and a respective threshold, as described herein.

As shown in FIG. 5, at step 508, process 500 may include receiving at least one digital output signal. For example, controller 120 may receive at least one digital output signal (e.g., based on the threshold) from comparator 110.

In some non-limiting embodiments or aspects, controller 120 may receive a plurality of digital output signals from a plurality of comparators 110. In some non-limiting embodiments or aspects, a plurality of controllers 120 may be included, and each controller 120 may receive at least one digital output signal from at least one comparator 110 (e.g., a controller 120 for each comparator 110 and/or a controller 120 for each subset of a plurality of comparators 110).

In some non-limiting embodiments or aspects, steps 502-508 may be repeated. For example, steps 502-508 may be repeated a predetermined number of times (e.g., to receive a predetermined number of digital output signals associated with a predetermined number of pulses of light). Additionally or alternatively, controller 120 may determine whether to repeat steps 502-508.

As shown in FIG. 5, at step 510, process 500 may include adjusting the threshold. For example, controller 120 may adjust the threshold of comparator 110, as described herein.

In some non-limiting embodiments or aspects, controller 120 may adjust the threshold of comparator 110 according to a search algorithm or search pattern, as described herein.

In some non-limiting embodiments or aspects, a plurality of comparators 110 may be included, and controller 120 may adjust the threshold of at least one of (e.g., each of) comparators 110. In some non-limiting embodiments or aspects, controller 120 may adjust the threshold of each comparator 110 to be the same threshold value as the other comparators 110. Additionally or alternatively, controller 120 may adjust the threshold of each of comparator 110 independently, such that at least some comparators 110 may have a threshold value different than at least some other comparators 110.

In some non-limiting embodiments or aspects, steps 502-510 may be repeated. For example, steps 502-510 may be repeated a number of times based on the search algorithm and/or search pattern according to which controller 120 is adjusting the threshold. Additionally or alternatively, controller 120 may determine whether to repeat steps 502-510.

As shown in FIG. 5, at step 512, process 500 may include determining at least one aggregation. For example, controller 120 may determine at least one aggregation based on the digital output signal(s), as described herein.

In some non-limiting embodiments or aspects, controller 120 may adjust the threshold of comparator 110 based on the aggregation(s) (e.g., step 510 may follow step 512), as described herein.

In some non-limiting embodiments or aspects, steps 502-508 and 512 may be repeated or steps 502-512 may be repeated. For example, controller 120 may determine to repeat steps 502-508 and 512 or steps 502-512 based on the aggregation(s). Additionally or alternatively, process 500 may be repeated continuously (e.g., during operation of autonomous vehicle 102).

Figure 6A:
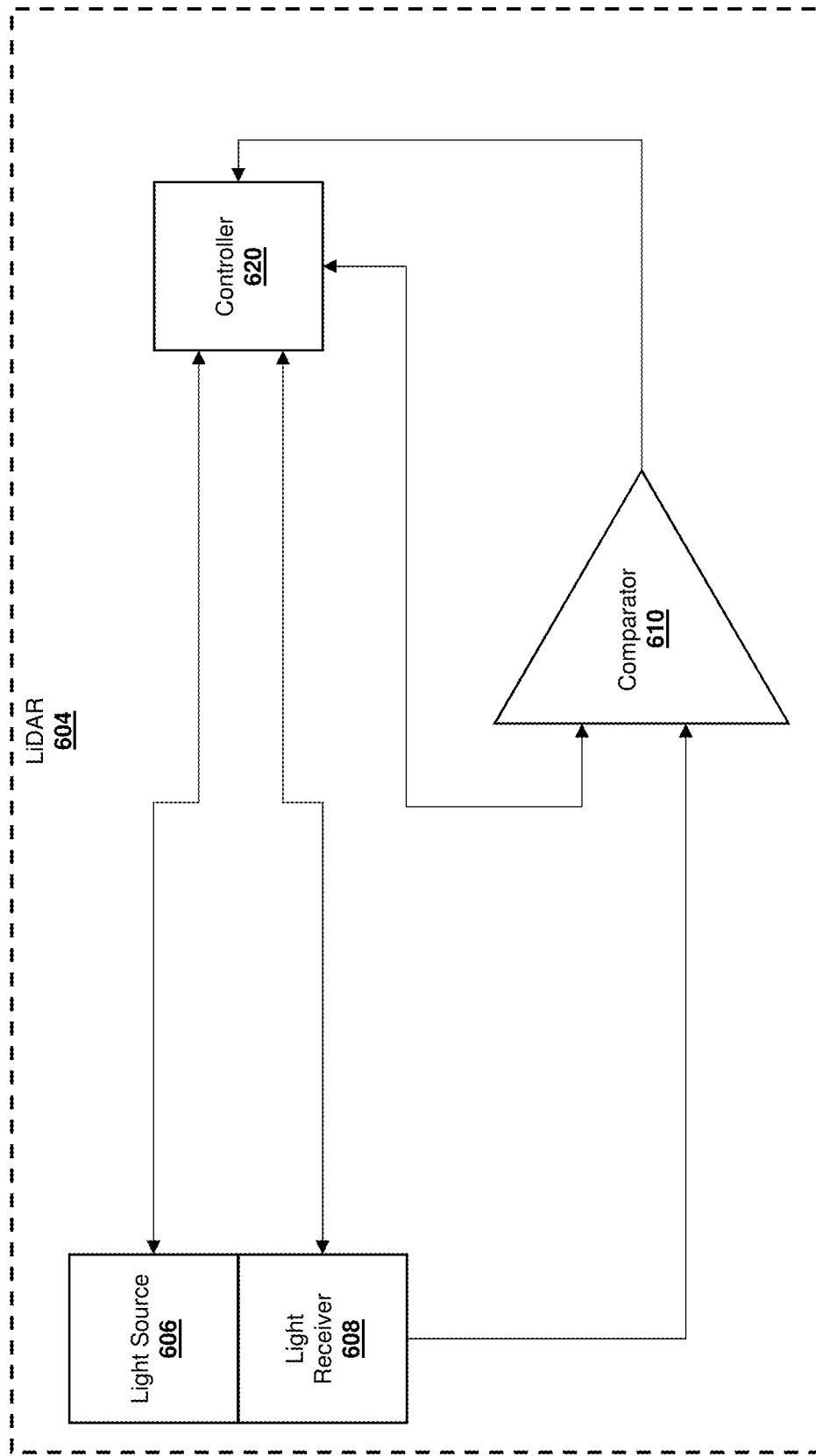
FIGS. 6A-6C are diagrams of exemplary implementations for a dynamic detection threshold for a sensor (e.g., LiDAR) of an autonomous vehicle, according to some non-limiting embodiments or aspects of the presently disclosed subject matter.
Figure 6B:
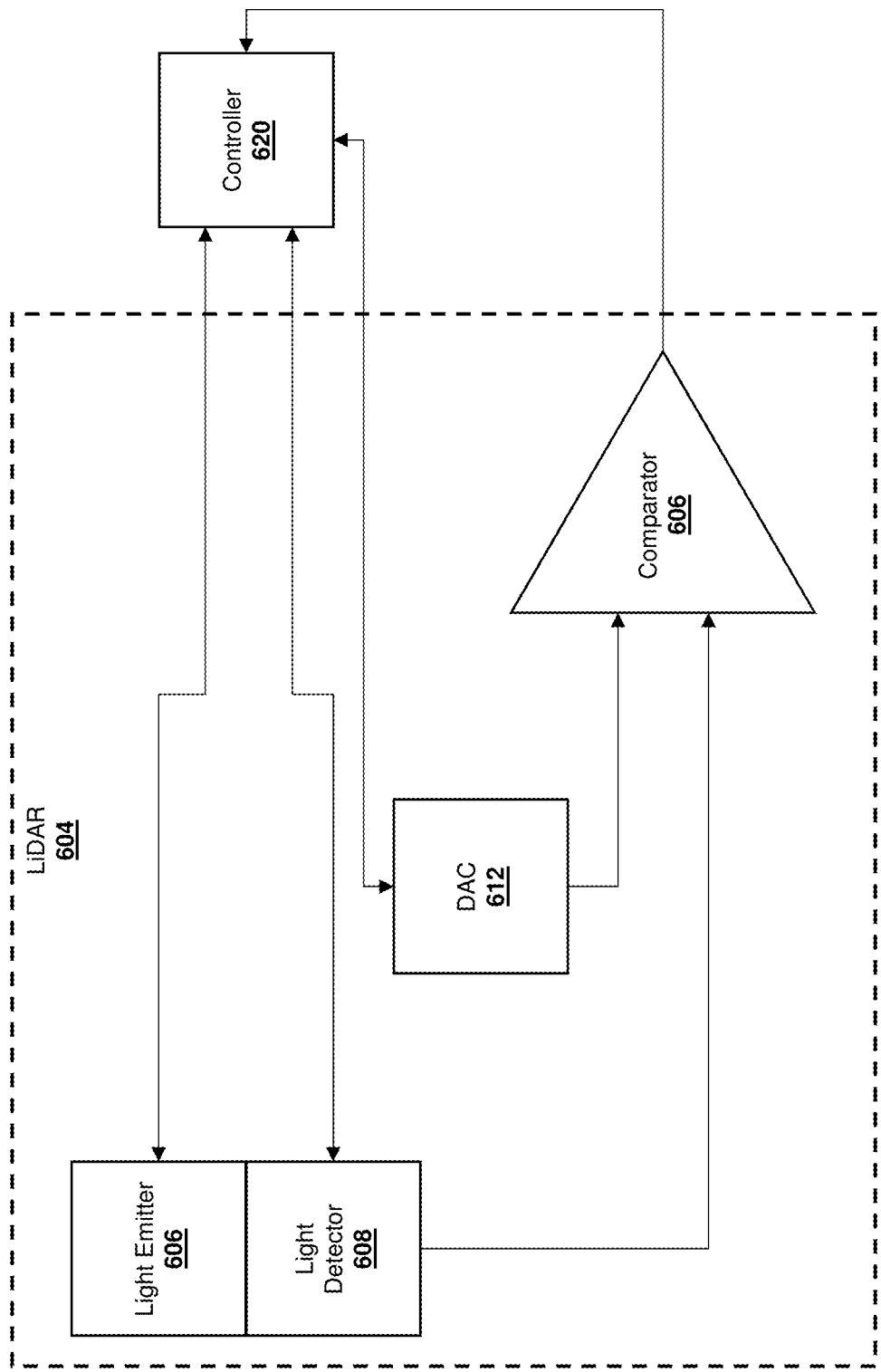
Figure 6C:
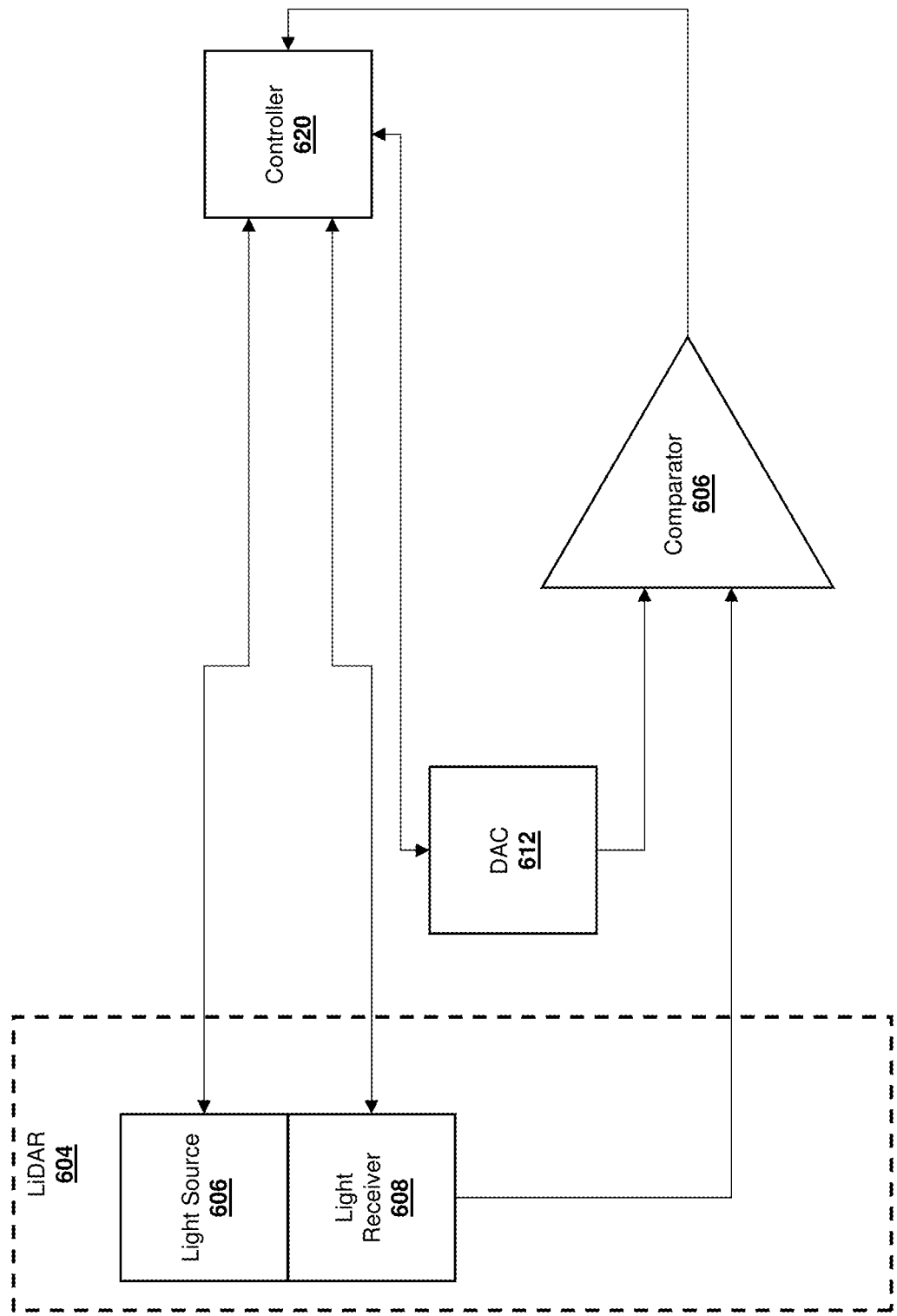

Referring now to FIGS. 6A-6C, FIGS. 6A-6C are diagrams of exemplary implementations 600a-600c of a system for a dynamic detection threshold for a sensor (e.g., LiDAR) of an autonomous vehicle, according to some non-limiting embodiments or aspects of the presently disclosed subject matter. As shown in FIGS. 6A-6C, implementations 600a-600c may include LiDAR system 604, light emitter 606, light detector 608, comparator 610, DAC 612, and/or controller 620. In some non-limiting embodiments or aspects, LiDAR system 604 may be the same as or similar to LiDAR system 104. In some non-limiting embodiments or aspects, light emitter 606 may be the same as or similar to light emitter 106. In some non-limiting embodiments or aspects, light detector 608 may be the same as or similar to light detector 108. In some non-limiting embodiments or aspects, comparator 610 may be the same as or similar to comparator 110. In some non-limiting embodiments or aspects, controller 620 may be the same as or similar to controller 120. The number and arrangement of components shown in FIGS. 6A-6C are provided as an example. In some non-limiting embodiments or aspects, implementations 600a-600c may include additional components, fewer components, different components, or differently arranged components than those shown in FIGS. 6A-6C. Additionally or alternatively, a set of components (e.g., one or more components) of implementations 600a-600c may perform one or more functions described as being performed by another set of components of implementations 600a-600c.

In some non-limiting embodiments or aspects, at least one of (e.g., all of) light emitter 606, light detector 608, comparator 610, DAC 612, and/or controller 620 may be part of LiDAR system 604. In some non-limiting embodiments or aspects, at least one of light emitter 606, light detector 608, comparator 610, DAC 612, and/or controller 620 may be separate from LiDAR system 604. For example, as shown in FIG. 6A, light emitter 606, light detector 608, comparator 610, and controller 620 may be part of LiDAR system 604. For example, as shown in FIG. 6B, light emitter 606, light detector 608, comparator 610, and DAC 612 may be part of LiDAR system 604, and controller 620 may be separate from LiDAR system 604. For example, as shown in FIG. 6C, light emitter 606 and light detector 608 may be part of LiDAR system 604, and comparator 610, DAC 612, and controller 620 may be separate from LiDAR system 604.

With continued reference to FIGS. 6A-6C, in some non-limiting embodiments or aspects, LiDAR system 604 may include at least one light emitter 606 and at least one light detector 608, as described herein. For example, light emitter 606 may be configured to emit pulses of light, as described herein, and light detector 608 may be configured to receive reflected pulses of light (e.g., the pulses of light from light emitter 606 reflected back to light detector 608), as described herein. Light detector 608 may be configured to generate analog output signals based on the reflected pulses of light, as described herein.

Comparator 610 may be configured to receive the analog output signals from light detector 608 and generate digital output signals based on the analog output signals and a threshold, as described herein. For example, an output of light detector 608 may be connected to a first comparator input of comparator 610, as described herein. Additionally or alternatively, controller 620 and/or DAC 612 may be connected to a second comparator input of comparator 610, as described herein. For example, DAC 612 may be connected to controller 620, and DAC 612 may be connected to the second comparator input of comparator 610, as described herein. Additionally or alternatively, controller 620 may include DAC 612 (e.g., DAC 612 may be part of and/or integrated with controller 620).

In some non-limiting embodiments or aspects, controller 620 may be configured to adjust the threshold, as described herein. For example, controller 620 may adjust the threshold by adjusting and/or controlling DAC 612 to adjust a voltage at the second comparator input of comparator 610. In some non-limiting embodiments or aspects, controller 620 may be configured to repeatedly (e.g., continuously, periodically, and/or the like) receive digital output signals from comparator 610 based on the threshold and/or to repeatedly adjust the threshold, as described herein.

Figure 7:
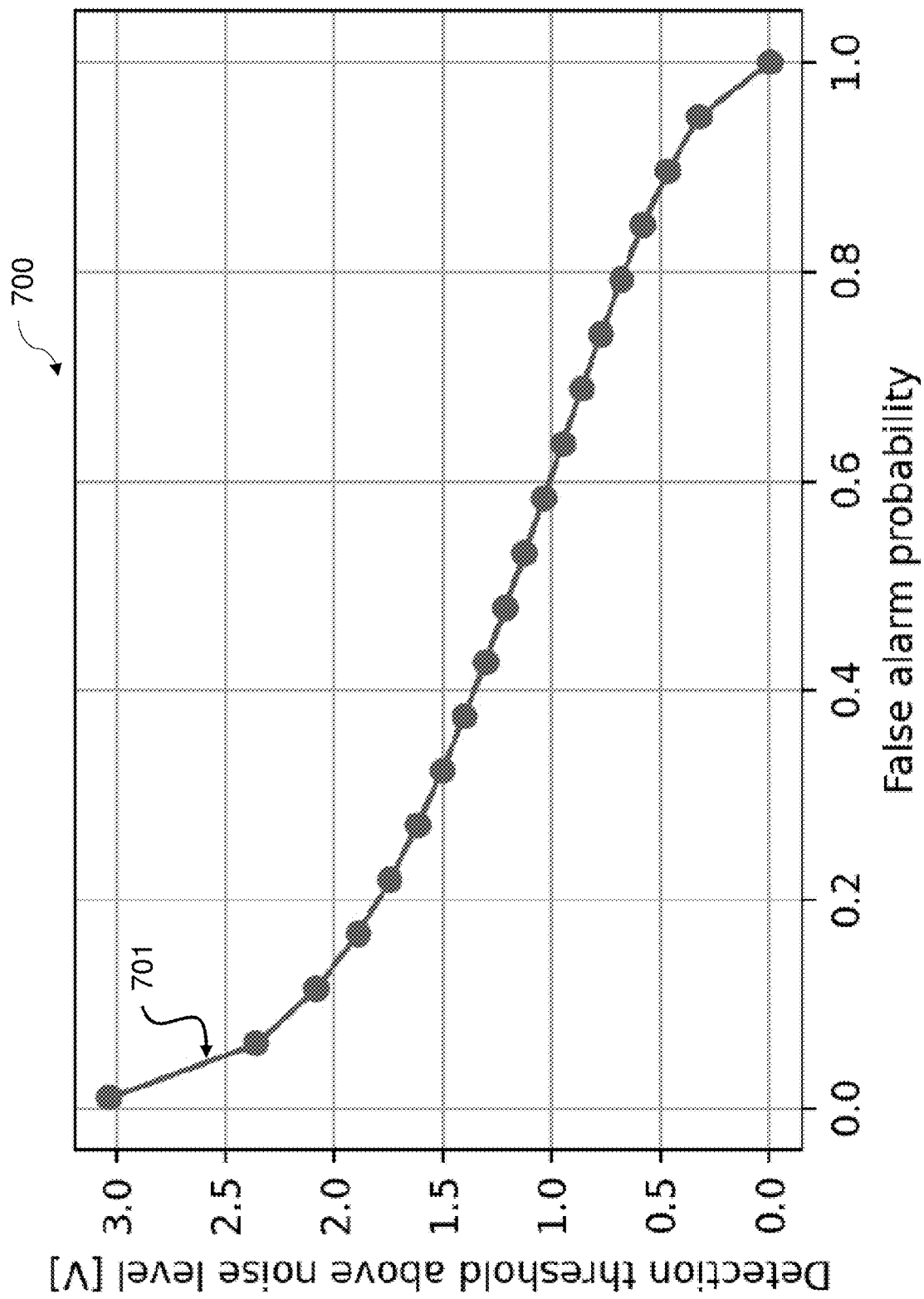
FIG. 7 is an exemplary graph of detection threshold and false detection probability, according to some non-limiting embodiments or aspects of the presently disclosed subject matter.

Referring now to FIG. 7, FIG. 7 is an exemplary graph 700 of detection threshold and false detection probability, according to some non-limiting embodiments or aspects of the presently disclosed subject matter. As shown in FIG. 7, graph 700 may include a vertical axis associated with a detection threshold above a noise level (e.g., in volts (V)) and a horizontal axis associated with a probability of a false detection (e.g., false alarm).

In some non-limiting embodiments or aspects, increasing the detection threshold may reduce the probability of a false detection. Additionally or alternatively, decreasing the detection threshold may increase the probability of a false detection.

Figure 8:
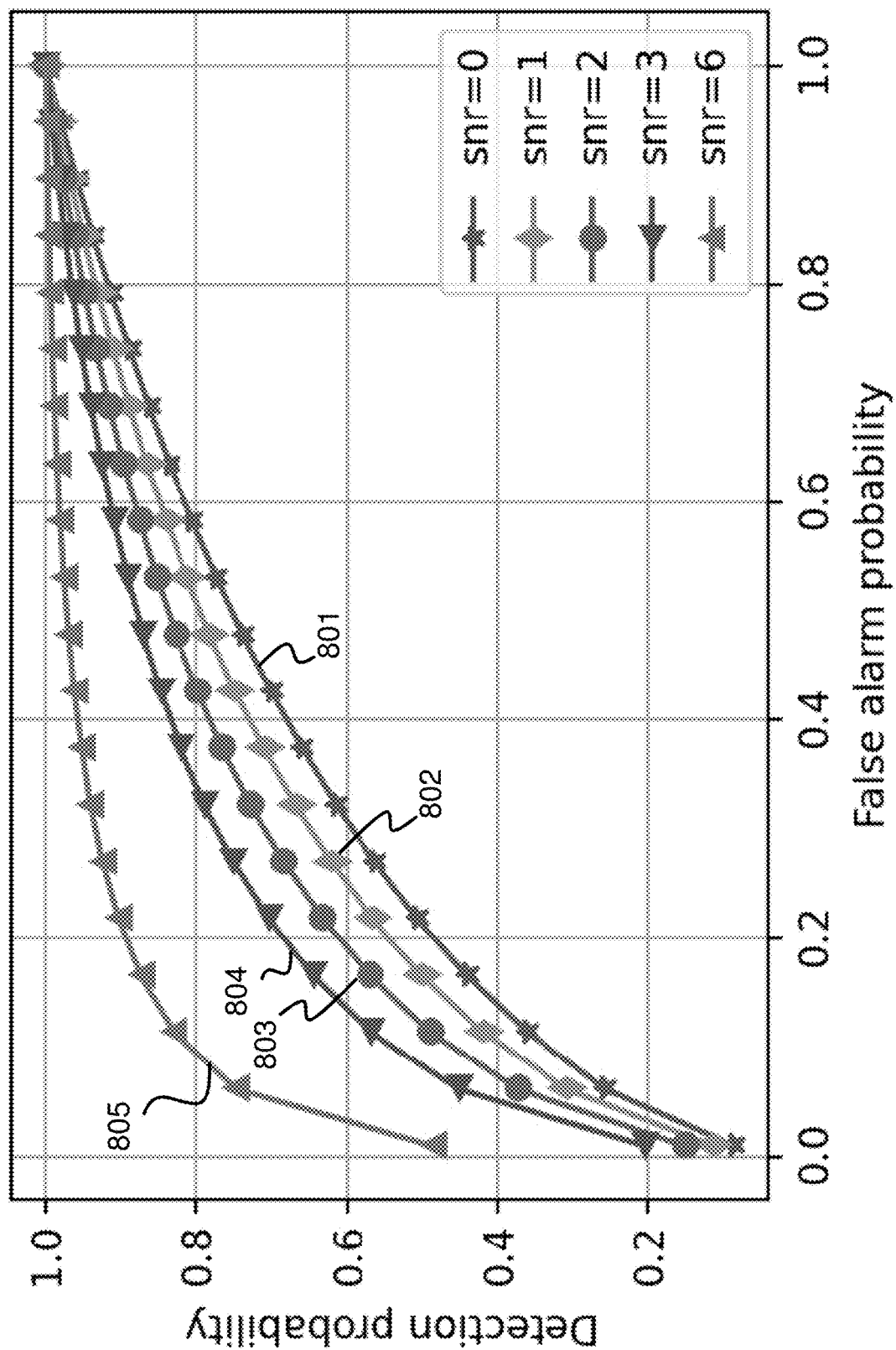
FIG. 8 is an exemplary graph of detection probability and false detection probability, according to some non-limiting embodiments or aspects of the presently disclosed subject matter.

Referring now to FIG. 8, FIG. 8 is an exemplary graph 800 of detection probability and false detection probability, according to some non-limiting embodiments or aspects of the presently disclosed subject matter. As shown in FIG. 8, graph 800 may include a vertical axis associated with a probability of a detection (e.g., true and/or accurate detection of an object) and a horizontal axis associated with a probability of a false detection (e.g., false alarm).

In some non-limiting embodiments or aspects, graph 800 may include multiple curves 801-805 for multiple different signal-to-noise ratios. For example, graph 800 may include a first curve 801 for a signal-to-noise ratio (SNR) of 0, a second curve 802 for an SNR of 1, a third curve 803 for an SNR of 2, a fourth curve 804 for an SNR of 3, and a fifth curve 805 for an SNR of 6.

In some non-limiting embodiments or aspects, the SNR associated with each curve may be the threshold, as described herein. In some non-limiting embodiments or aspects, an increased threshold (e.g., a higher value for SNR) may be associated with a reduced probability of a false detection relative to a probability of a (true) detection. Additionally or alternatively, a decreased threshold (e.g., lower value for SNR) may be associated with an increased probability of a false detection relative to a probability of a (true) detection.

It is to be appreciated that the Detailed Description section, and not any other section, is intended to be used to interpret the claims. Other sections can set forth one or more but not all exemplary embodiments or aspects as contemplated by the inventor(s), and thus, are not intended to limit this disclosure or the appended claims in any way.

While this disclosure describes exemplary embodiments or aspects for exemplary fields and applications, it should be understood that the disclosure is not limited thereto. Other embodiments and modifications thereto are possible, and are within the scope and spirit of this disclosure. For example, and without limiting the generality of this paragraph, embodiments or aspects are not limited to the software, hardware, firmware, and/or entities illustrated in the figures and/or described herein. Further, embodiments or aspects (whether or not explicitly described herein) have significant utility to fields and applications beyond the examples described herein.

Embodiments or aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments or aspects can perform functional blocks, steps, operations, methods, etc. using orderings different than those described herein.

References herein to "one" embodiment or aspect, "an" embodiment or aspect, "an example" embodiment or aspect, or similar phrases, indicate that the embodiment or aspect described can include a particular feature, structure, or characteristic, but every embodiment or aspect can not necessarily include the particular feature, structure, or characteristic. Moreover, such phrases are not necessarily referring to the same embodiment or aspect. Further, when a particular feature, structure, or characteristic is described in connection with an embodiment or aspect, it would be within the knowledge of persons skilled in the relevant art(s) to incorporate such feature, structure, or characteristic into other embodiments or aspects whether or not explicitly mentioned or described herein. Additionally, some embodiments or aspects can be described using the expression "coupled" and "connected" along with their derivatives. These terms are not necessarily intended as synonyms for each other. For example, some embodiments or aspects can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments or aspects but should be defined only in accordance with the following claims and their equivalents.

What is claimed is:

1. A system for a dynamic detection threshold for a sensor of an autonomous vehicle, comprising:
 a Light Detection and Ranging (LiDAR) system of an autonomous vehicle, the LiDAR system comprising at least one light emitter configured to emit pulses of light and at least one light detector configured to receive reflected pulses of light and generate analog output signals based on the reflected pulses of light, the reflected pulses of light comprising the pulses of light reflected back to the at least one light detector;
 a comparator configured to receive the analog output signals from the light detector and generate digital output signals based on the analog output signals and a threshold; and
 a controller configured to:
 receive a first digital output signal of the digital output signals from the comparator based on the threshold;
 adjust the threshold;
 receive at least one further digital output signal of the digital output signals from the comparator based on the threshold as adjusted; and determine at least one aggregation based on the first digital output signal and the at least one further digital output signal,
wherein the at least one further digital output signal comprises a plurality of further digital output signals,
wherein adjusting the threshold and receiving the at least one further digital output signal comprises:
repeatedly adjusting the threshold and receiving a respective further digital output signal of the plurality of further digital output signals based on the threshold as adjusted,
wherein repeatedly adjusting the threshold and receiving a respective further digital output signal of the plurality of further digital output signals based on the threshold as adjusted comprises:
repeatedly adjusting the threshold according to a first linear search within a first range; and
repeatedly adjusting the threshold according to a second linear search within a second range.

2. The system of claim 1, wherein the at least one light emitter comprises a plurality of light emitters, and wherein the at least one light detector comprises a plurality of light detectors.

3. The system of claim 1, wherein the controller is further configured to detect at least one object in an environment surrounding the autonomous vehicle based on the at least one aggregation.

4. The system of claim 3, wherein the controller is further configured to issue at least one command to cause the autonomous vehicle to perform at least one autonomous driving operation based on detecting the at least one object.

5. The system of claim 1, wherein the controller is further configured to issue at least one command to cause the autonomous vehicle to perform at least one autonomous driving operation based on the at least one aggregation.

6. The system of claim 1, wherein the pulses of light comprise a first pulse of light associated with the first digital output signal and at least one further pulse of light associated with the at least one further digital output signal.

7. The system of claim 6, wherein the LiDAR system is configured to rotate the at least one light emitter and the at least one light detector, wherein a field of view of the LiDAR system rotates as the at least one light emitter and the at least one light detector rotate, and wherein a pulse repetition rate of the pulses of light is sufficiently high that the field of view when emitting the first pulse of light at least partially overlaps with the field of view when emitting the at least one further pulse of light.

8. The system of claim 1, wherein repeatedly adjusting the threshold and receiving the respective further digital output signal of the plurality of further digital output signals based on the threshold as adjusted comprises adjusting the threshold according to at least one of:
a linear search;
a low-to-high search;
a high-to-low search;
a binary search;
a sawtooth search; or
any combination thereof.

9. The system of claim 1, wherein the second range is based on a first threshold value within the first range for which the respective further digital output signal is associated with detection of an object and a second threshold value within the first range for which the respective further digital output signal is associated with not detecting the object.

10. The system of claim 1, wherein the threshold comprises at least one of:

a linear value of voltage above a noise voltage level;
an exponential value of voltage above the noise voltage level;
a value of full width at half maximum;
a signal-to-noise ratio (SNR); or
any combination thereof.

11. The system of claim 1, wherein the controller is further configured to determine an approximate amplitude of the analog output signals based on the at least one aggregation.

12. The system of claim 1, further comprising a time-to-digital converter (TDC) configured to determine at least one time of flight (TOF) based on at least one pulse of light of the pulses of light and at least one reflected pulse of light of the reflected pulses of light.

13. The system of claim 12, wherein the TDC is configured to receive the at least one aggregation and wherein determining the at least one TOF comprises determining the at least one TOF based on the at least one aggregation.

14. The system of claim 1, wherein the controller is further configured to determine a target threshold based on the at least one aggregation.

15. The system of claim 14, wherein the target threshold comprises at least one of:
an optimal threshold value;
a threshold value that increases a signal-to-noise ratio (SNR); or
any combination thereof.

16. The system of claim 1, further comprising a digital-to-analog converter (DAC), wherein the DAC is connected to the controller, wherein an output of the at least one light detector is connected to a first comparator input of the comparator, wherein the DAC is connected to a second comparator input of the comparator, and wherein the controller is configured to adjust the threshold by controlling the DAC to adjust a voltage at the second comparator input of the comparator.

17. A method for a dynamic detection threshold for a sensor of an autonomous vehicle, comprising:
emitting, with at least one light emitter of a LiDAR system of an autonomous vehicle, at least one first pulse of light;
receiving, with at least one light detector of the LiDAR system of the autonomous vehicle, at least one first reflected pulse of light comprising the at least one first pulse of light reflected back to the at least one light detector;
generating, with the at least one light detector, at least one first analog output signal based on the at least one first reflected pulse of light;
receiving, with at least one comparator, the at least one first analog output signal from the at least one light detector;
generating, with the at least one comparator, at least one first digital output signal based on the at least one first analog output signal and a threshold;
receiving, with at least one controller, the at least one first digital output signal from the comparator;
adjusting, with the at least one controller, the threshold;
emitting, with the at least one light emitter, at least one further pulse of light;
receiving, with the at least one light detector, at least one further reflected pulse of light comprising the at least one further pulse of light reflected back to the at least one light detector;

generating, with the at least one light detector, at least one further analog output signal based on the at least one further reflected pulse of light;

receiving, with the at least one comparator, the at least one further analog output signal from the at least one light detector;

generating, with the at least one comparator, at least one further digital output signal based on the at least one further analog output signal and the threshold as adjusted;

receiving, with the at least one controller, the at least one further digital output signal from the comparator; and determining, with the at least one controller, at least one aggregation based on the at least one first digital output signal and the at least one further digital output signal, wherein the at least one further digital output signal comprises a plurality of further digital output signals, wherein adjusting, with the at least one controller, the threshold and receiving, with the at least one controller, the at least one further digital output signal comprises:

repeatedly adjusting the threshold and receiving a respective further digital output signal of the plurality of further digital output signals based on the threshold as adjusted, wherein repeatedly adjusting the threshold and receiving a respective further digital output signal of the plurality of further digital output signals based on the threshold as adjusted comprises:

repeatedly adjusting the threshold according to a first linear search within a first range; and repeatedly adjusting the threshold according to a second linear search within a second range.

18. A computer program product for a dynamic detection threshold for a sensor of an autonomous vehicle, comprising at least one non-transitory computer-readable medium comprising one or more instructions that, when executed by at least one processor, cause the at least one processor to:

receive at least one first digital output signal from a comparator, the at least one first digital output signal based on a threshold and at least one first analog output signal of at least one light detector of a LiDAR system of an autonomous vehicle;

adjust the threshold;

receive at least one further digital output signal from the comparator, the at least one further digital output signal based on the threshold as adjusted and at least one further analog output signal of the at least one light detector; and determine at least one aggregation based on the at least one first digital output signal and the at least one further digital output signal, wherein the at least one further digital output signal comprises a plurality of further digital output signals, wherein adjusting the threshold and receiving the at least one further digital output signal comprises:

repeatedly adjusting the threshold and receiving a respective further digital output signal of the plurality of further digital output signals based on the threshold as adjusted, wherein repeatedly adjusting the threshold and receiving a respective further digital output signal of the plurality of further digital output signals based on the threshold as adjusted comprises:

repeatedly adjusting the threshold according to a first linear search within a first range; and repeatedly adjusting the threshold according to a second linear search within a second range.

* * * * *